Aug. 5, 1952  L. G. SCHEIB  2,605,597
WRAPPING MACHINE
Filed Feb. 20, 1950  14 Sheets-Sheet 1
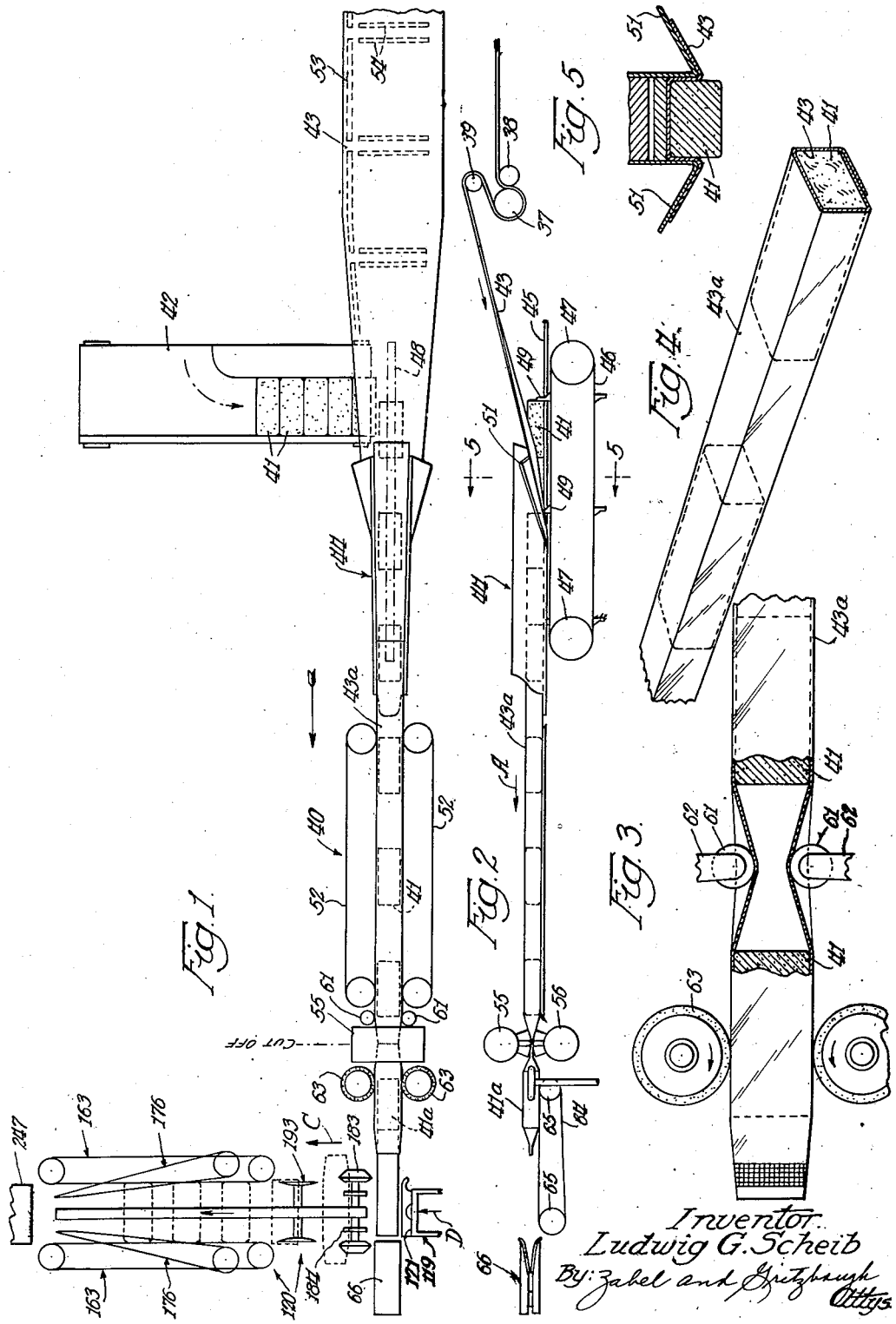

Aug. 5, 1952          L. G. SCHEIB          2,605,597
WRAPPING MACHINE

Filed Feb. 20, 1950                             14 Sheets-Sheet 2

Inventor
Ludwig G. Scheib
By Zabel and Fitzbaugh
Attys.

Aug. 5, 1952

L. G. SCHEIB 2,605,597

WRAPPING MACHINE

Filed Feb. 20, 1950

Inventor
Ludwig G. Scheib
By: Zabel and Spitzbaugh
Attys.

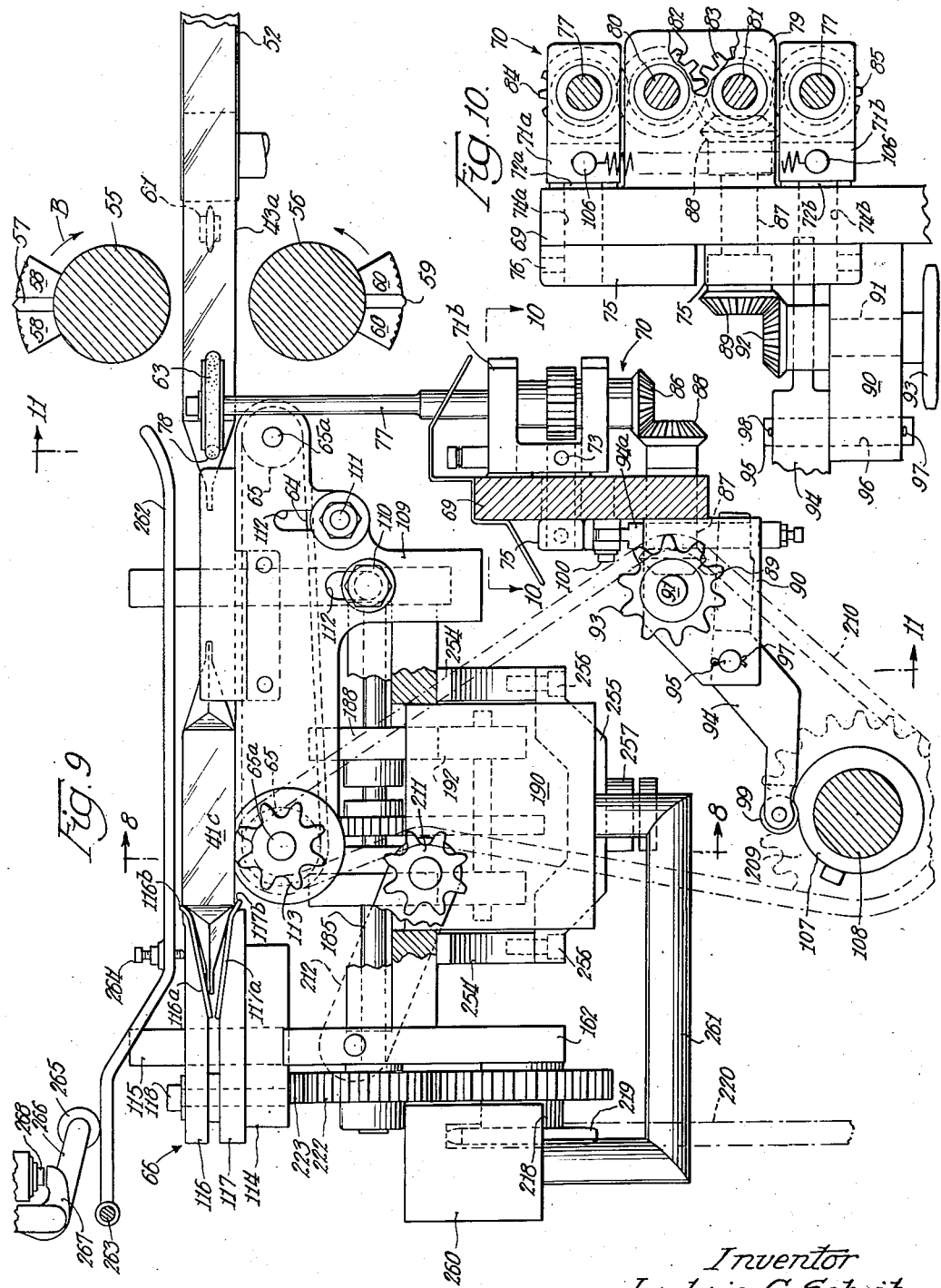

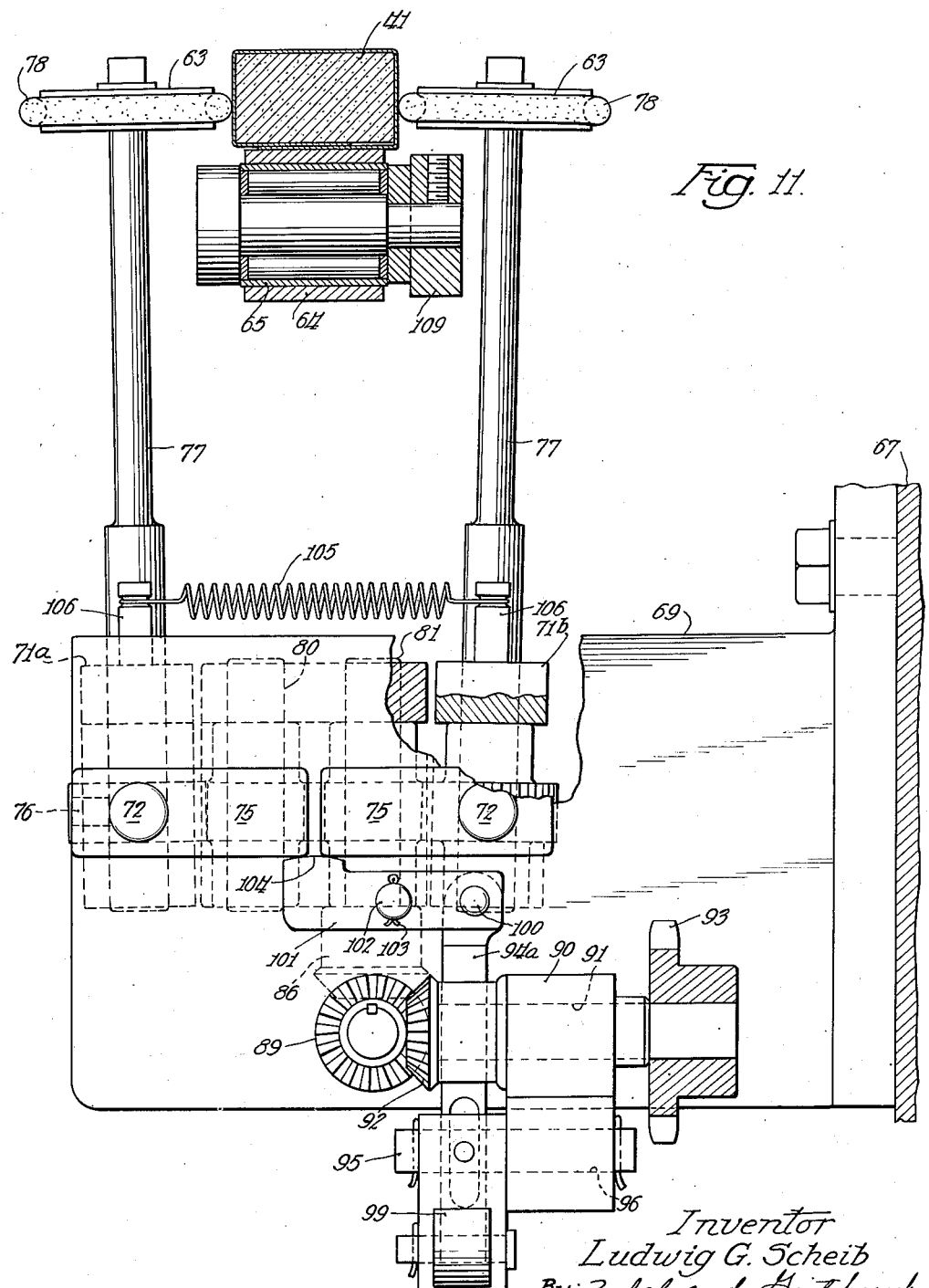

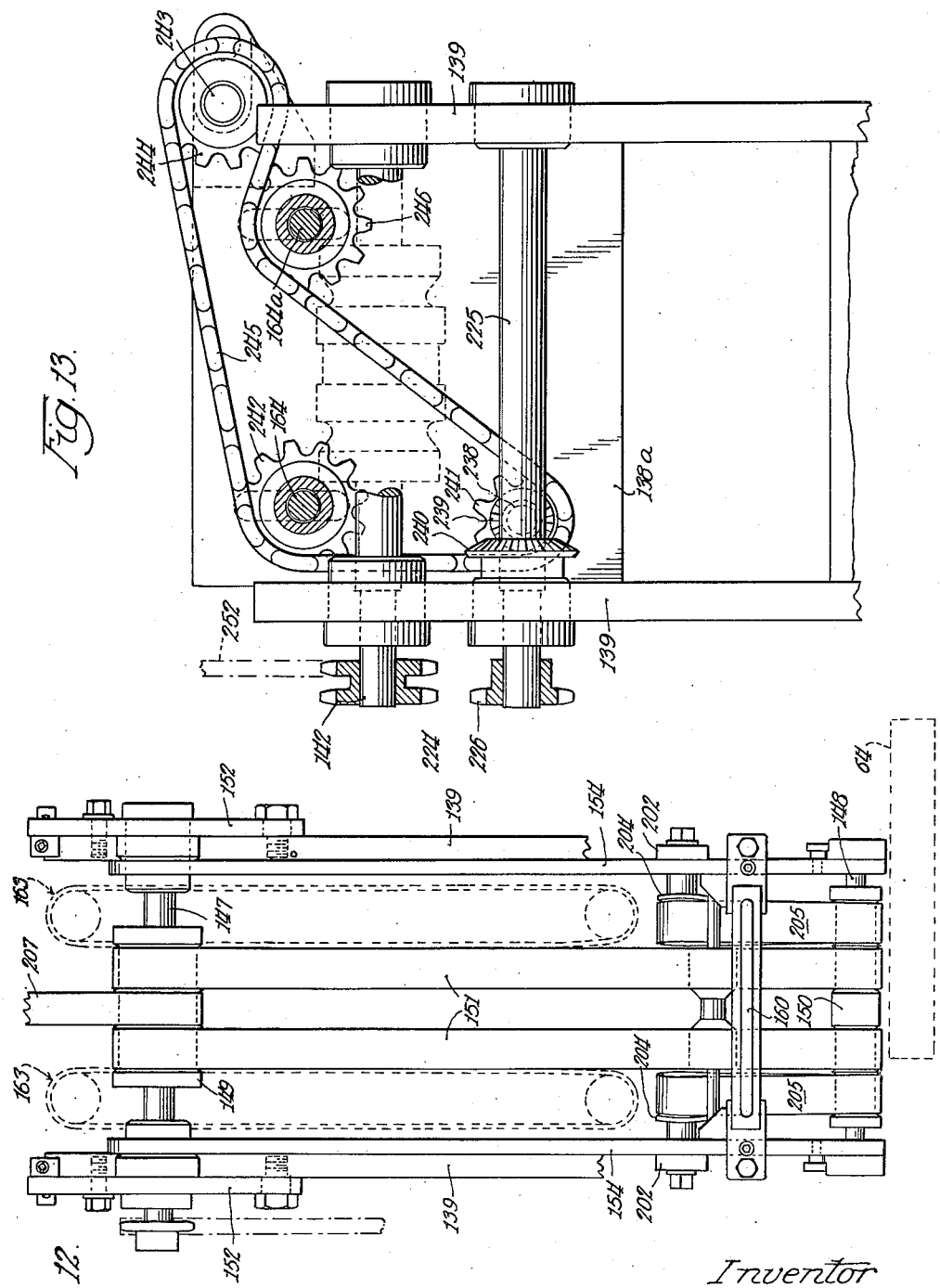

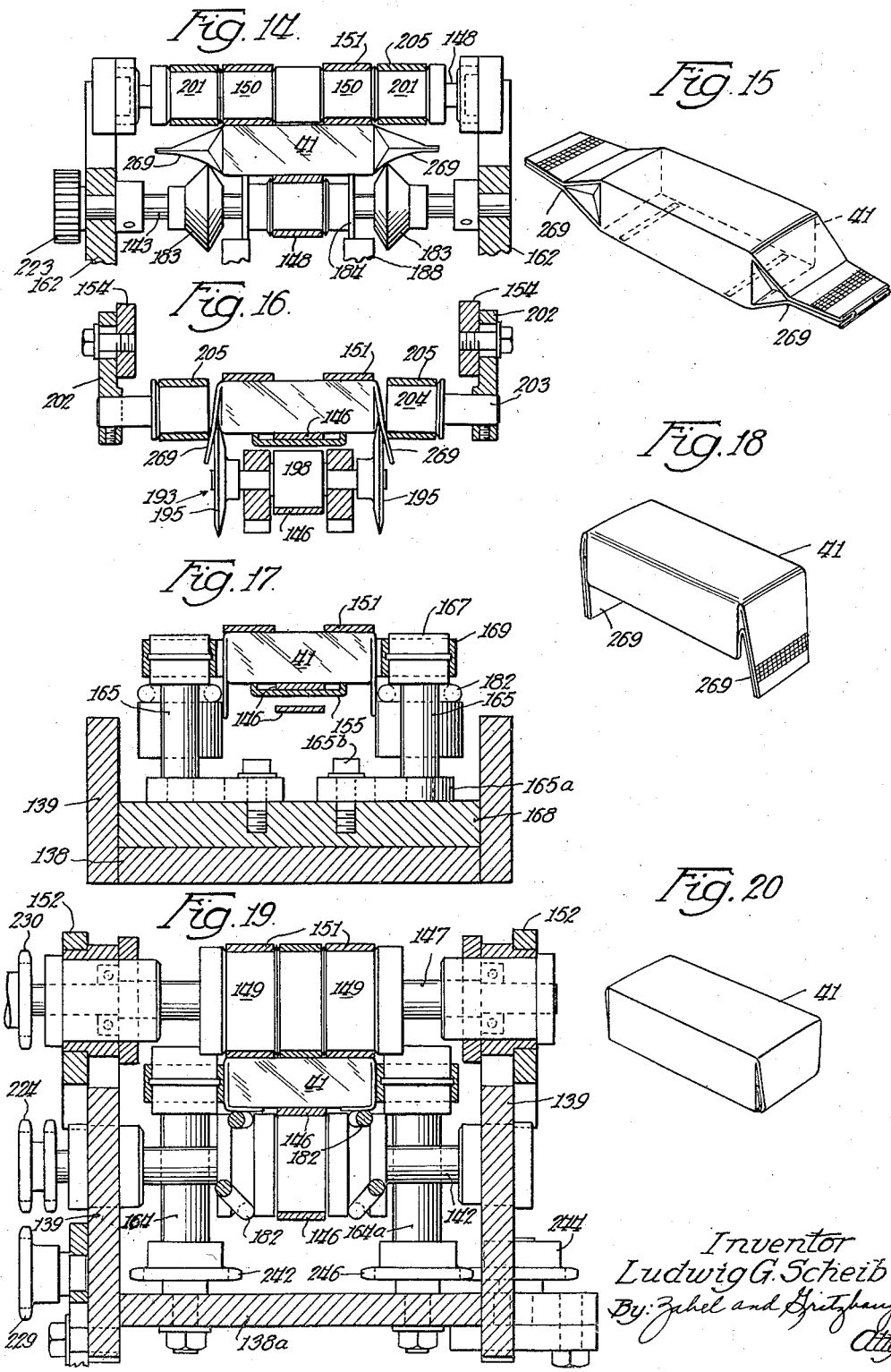

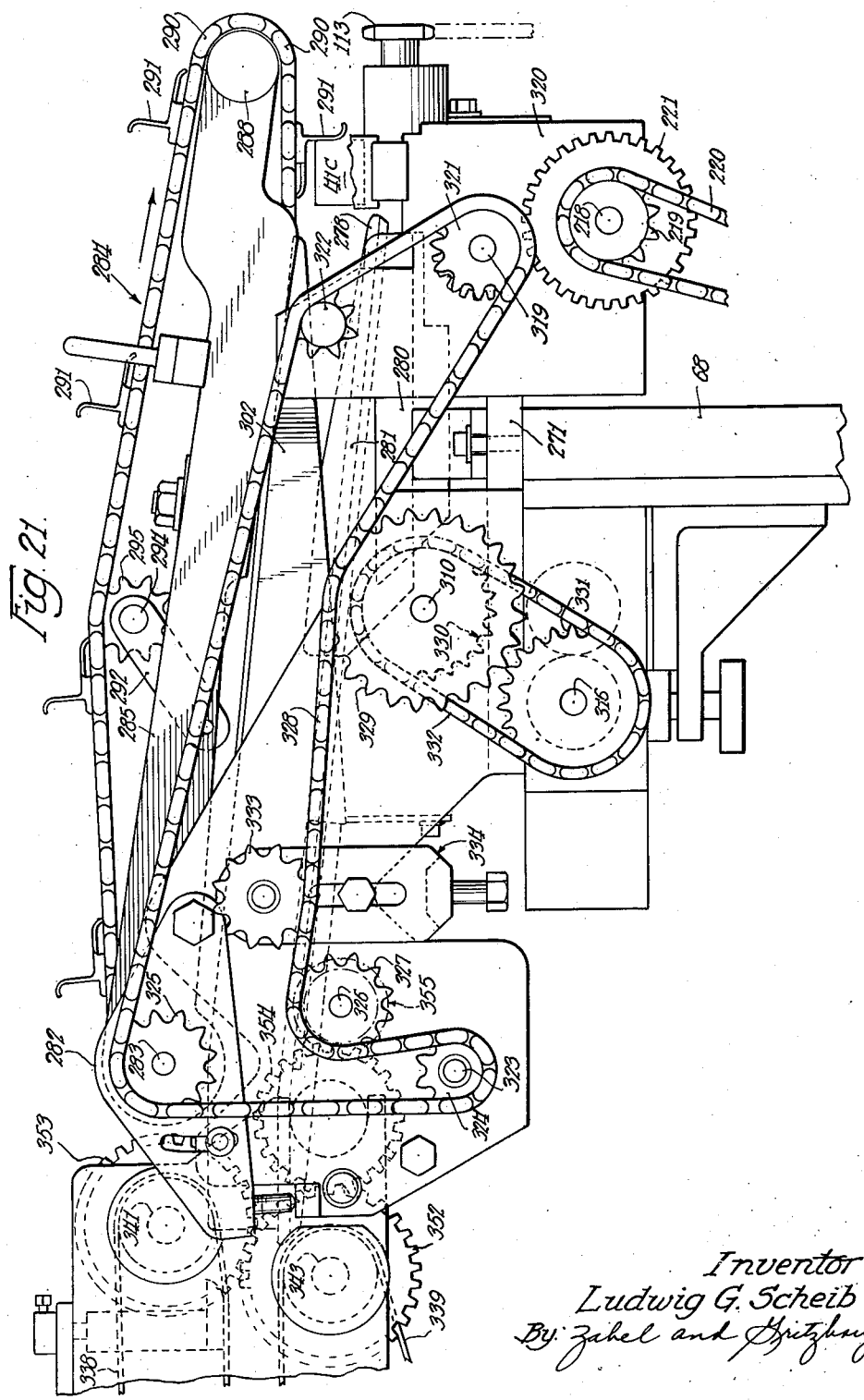

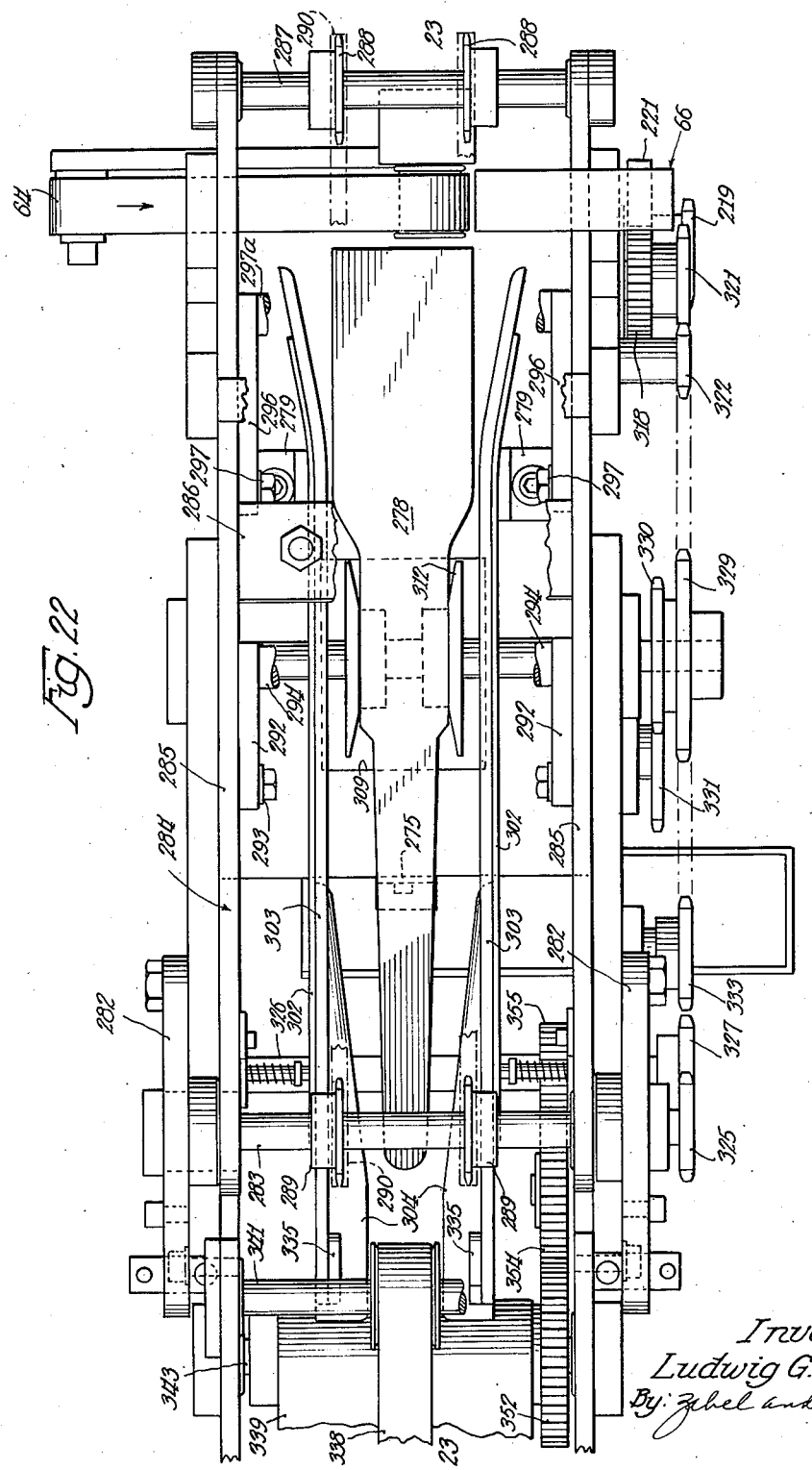

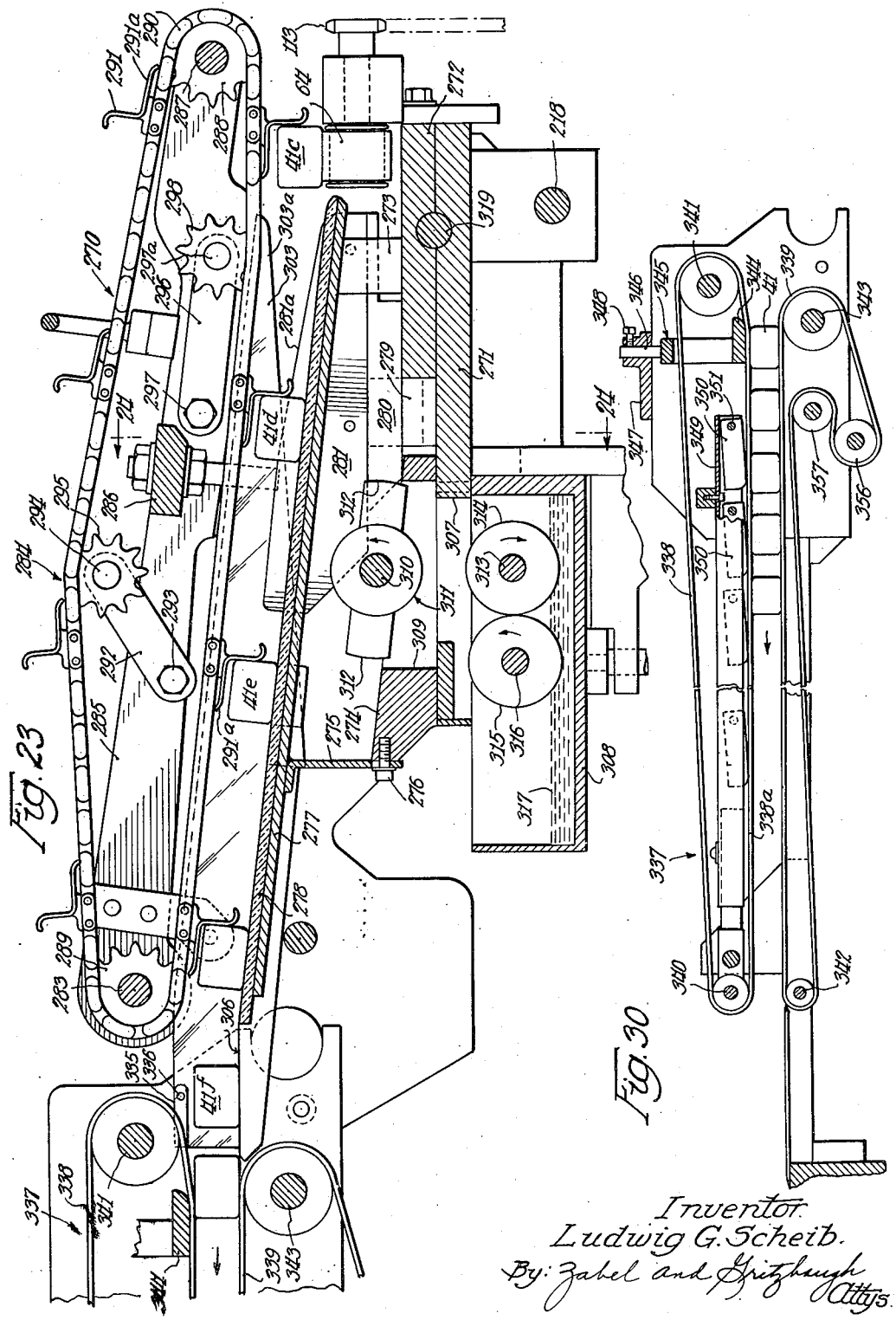

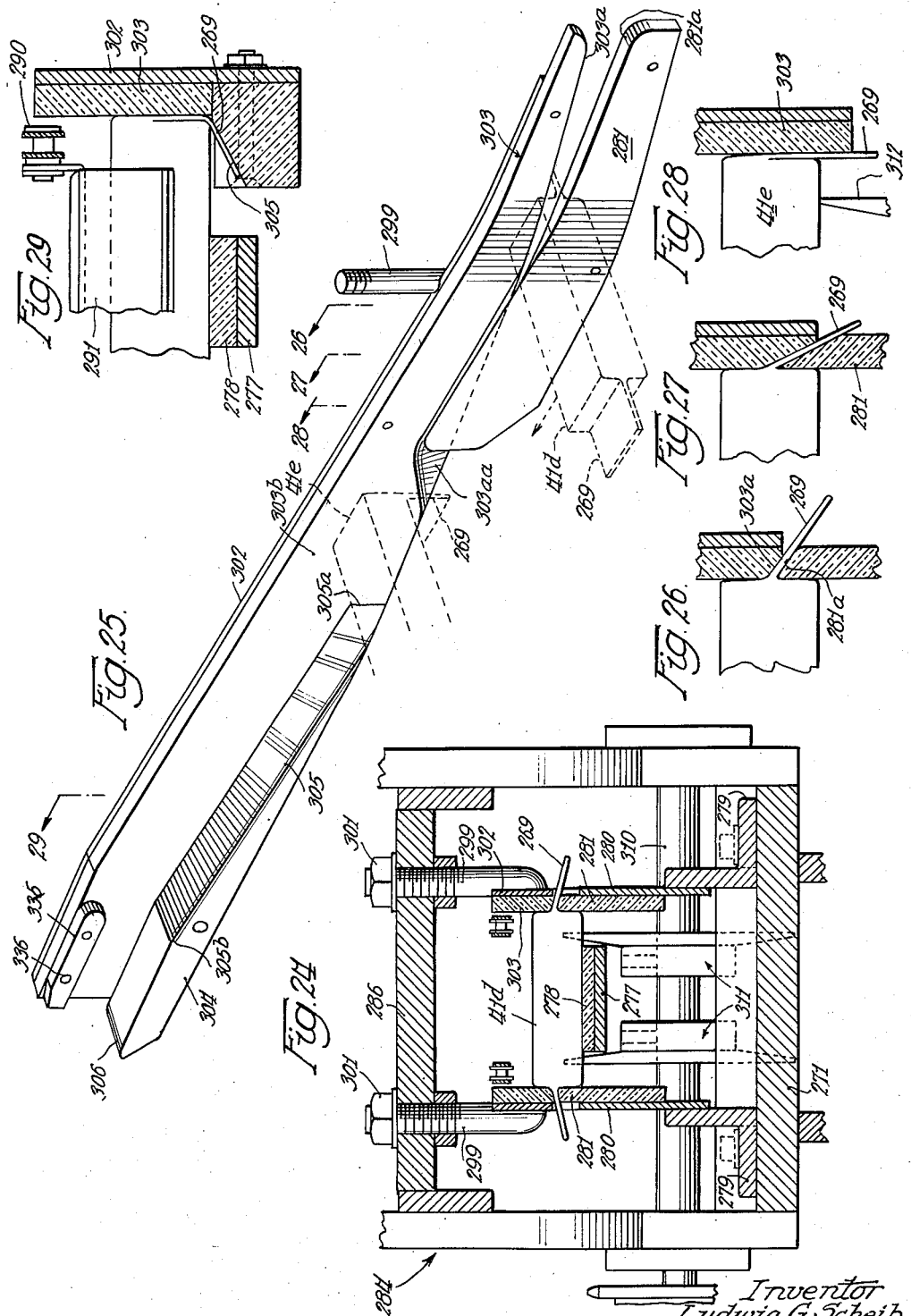

Aug. 5, 1952 L. G. SCHEIB 2,605,597
WRAPPING MACHINE
Filed Feb. 20, 1950 14 Sheets-Sheet 13
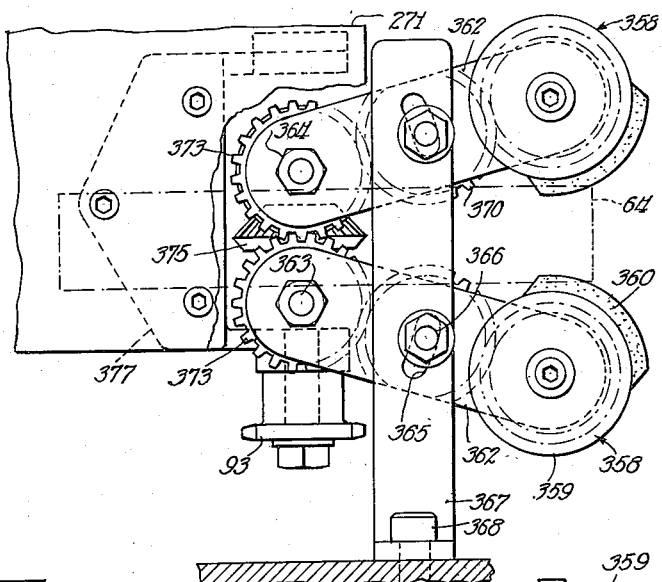
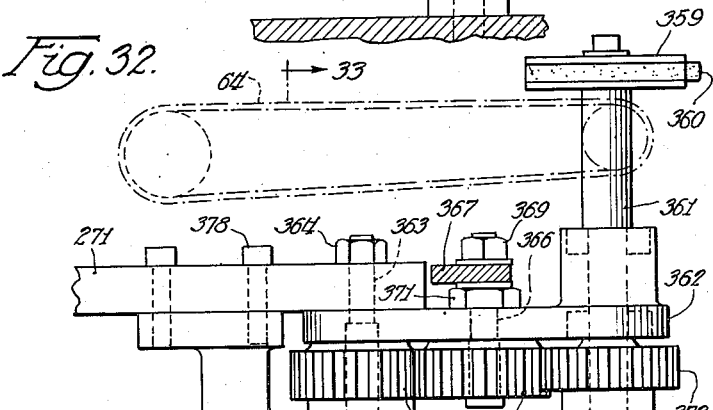
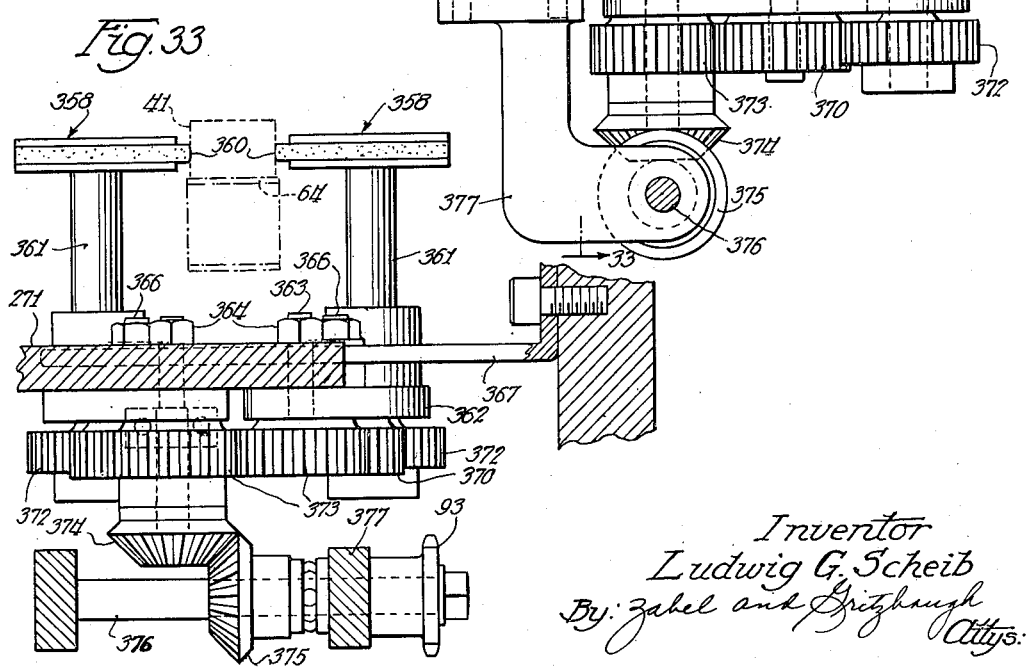
Inventor
Ludwig G. Scheib
By: Zabel and Fitzhaugh
Attys.

Aug. 5, 1952  L. G. SCHEIB  2,605,597
WRAPPING MACHINE

Filed Feb. 20, 1950  14 Sheets-Sheet 14

Inventor
Ludwig G. Scheib
By: Zabel and Fitzbugh
Attys.

Patented Aug. 5, 1952

2,605,597

UNITED STATES PATENT OFFICE 2,605,597

WRAPPING MACHINE

Ludwig G. Scheib, Chicago, Ill., assignor to Mars, Incorporated, Chicago, Ill., a corporation of Delaware Application February 20, 1950, Serial No. 145,164

6 Claims. (Cl. 53—88)

The present invention relates to a wrapping machine, particularly one that automatically wraps paper about a candy bar and glues the wrapping paper at the proper places so that when each bar leaves the machine it is completely wrapped and ready to be packed into boxes for shipment. The candy bars contemplated for the present machine have soft or medium hard centers and are coated with chocolate. Thus the products upon which the present machine performs its numerous wrapping operations are fragile to the extent that they can be crushed or distorted in shape and the chocolate coating can very easily be broken or marred if the bars are roughly handled or too much force is applied to the bars while the machine is performing its numerous operations.

Thus it is an object of the present invention to provide a machine that rapidly and neatly wraps candy bars without in any way crushing or distorting the shape of the bars and without cracking or in any way marring the chocolate coating.

The machine embodying the invention is intended to operate at high rates of speed, turning out a relatively large number of completely wrapped bars and it is required that such a machine be substantially foolproof in its operation because even a fraction of a second's obstruction by one of the bars while it is passing through the machine will cause other bars to pile up so as to completely shut down the machine and the production line in which the machine is operating. Normally the problem of cleaning a machine following such a piling up of candy bars, is both difficult and tedious, in most instances requiring the use of a considerable amount of high temperature steam in order to remove the candy from the machine mechanisms. While this steam is useful in melting the candy and thus cleaning up the machine, it also dries up the oil in the bearings and thus over a period of time may result in actual damage to the working parts of the machine.

It is another object of the present invention to provide a machine that is relatively simple in its construction and is open and relatively free of complex mechanisms and crowded parts in the regions where the piling up of the candy bars is most likely to occur. At the same time the machine provides an automatic safety shut-off device that immediately discontinues the machine operation when a pile up of the candy occurs.

All of the foregoing constitute some of the principal objects and advantages of the present invention, others of which will become apparent from the following description and from the drawings, in which:

Fig. 1 is a diagrammatic plan view illustrating a wrapping machine embodying the present invention;

Fig. 2 is a diagrammatic side elevational view of the wrapping machine illustrated in Fig. 1;

Fig. 3 is an enlarged diagrammatic plan view of a portion only of the wrapping machine, illustrating in particular the pull discs that engage the partially wrapped candy bars and advance them during the tucking and cutting off operations;

Fig. 4 is a fragmentary perspective view illustrating two candy bars disposed in the continuous sheet of wrapping paper after the paper has been completely folded around the sides and underneath the bars;

Fig. 5 is a transverse sectional view taken through a portion of the machine, the view being taken along line 5—5 of Fig. 2;

Fig. 9 is a vertical sectional view shown partly in elevation taken through the wrapping machine, the view being taken along the line 9—9 of Fig. 6;

Fig. 10 is an enlarged transverse sectional view taken through a portion of the drive for the machine, the view being taken along the line 10—10 of Fig. 9;

Fig. 11 is an enlarged vertical, sectional view taken through the machine at the position of the pull discs, the view being taken along the line 11—11 of Fig. 9;

Fig. 12 is a top plan view of that portion of the machine illustrated in Fig. 8, the view being reduced somewhat in size;

Fig. 13 is an enlarged horizontal, sectional view through a portion of the machine, the view being taken along line 13—13 of Fig. 7;

Fig. 14 is a vertical sectional view through a portion of the machine, the view being taken along line 14—14 of Fig. 8 and illustrating a first position of a candy bar at the beginning of the fold down and tucking operations for the end flaps of the wrapper;

Fig. 15 is a perspective view of a candy bar showing the condition of the wrapper at the time the bar assumes the position illustrated in Fig. 14;

Fig. 16 is a vertical sectional view through a portion of the machine, the view being taken along the line 16—16 of Fig. 8 and illustrating a second position of the candy bar where the underneath portions of the end flaps are tucked under preparatory to bending downwardly the end flaps;

Fig. 17 is a vertical sectional view through the machine, the view being taken along the line 17—17 of Fig. 8 and illustrating the position of a candy bar at the time the end flaps are folded downwardly;

Fig. 18 is a perspective view of a candy bar showing its condition when disposed in the position illustrated in Fig. 17;

Fig. 19 is a vertical sectional view taken through the machine along the line 19—19 of Fig. 8 and illustrating a candy bar and the mechanism that folds the end flaps underneath the bar to complete the wrapping operation;

Fig. 20 is a perspective view of the candy bar completely wrapped;

Fig. 21 is a fragmentary side elevational view of a modified form for the final conveyor on which the end flaps of the candy bar wrappers are tucked, folded and glued into position;

Fig. 22 is a plan view of the mechanism illustrated in Fig. 21;

Fig. 23 is a longitudinal sectional view through the modified embodiment of the machine, the view being taken along line 23—23 of Fig. 2;

Fig. 24 is a fragmentary, vertical sectional view through the second embodiment of the machine, the view being taken along the line 24—24 of Fig. 23;

Fig. 25 is an enlarged perspective view showing the plow portion of the second embodiment of the machine, only one of the plows being illustrated;

Figure 6:
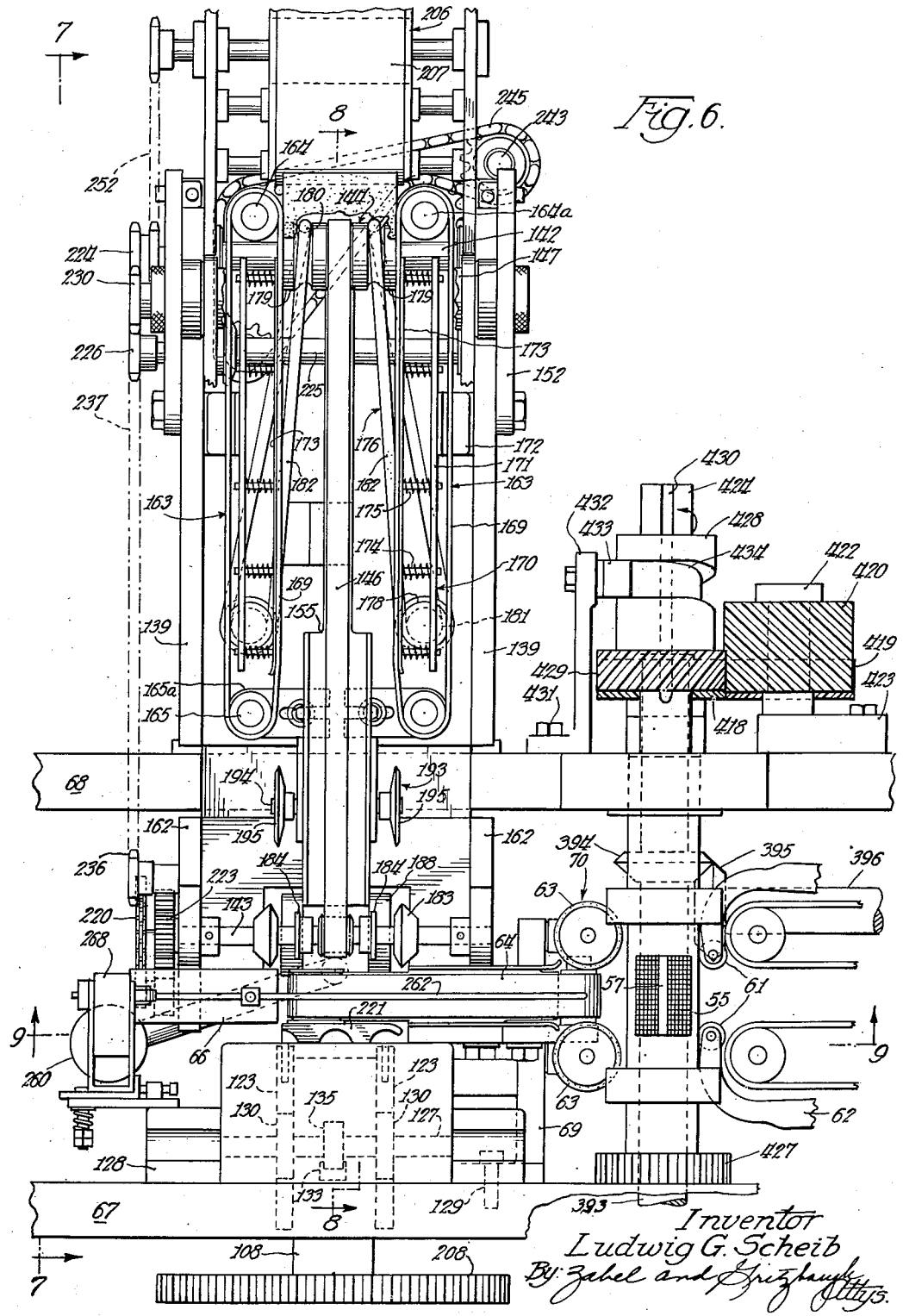
Fig. 6 is a plan view of the wrapping machine illustrating that portion of the machine that embodies the present invention.
Figure 34:
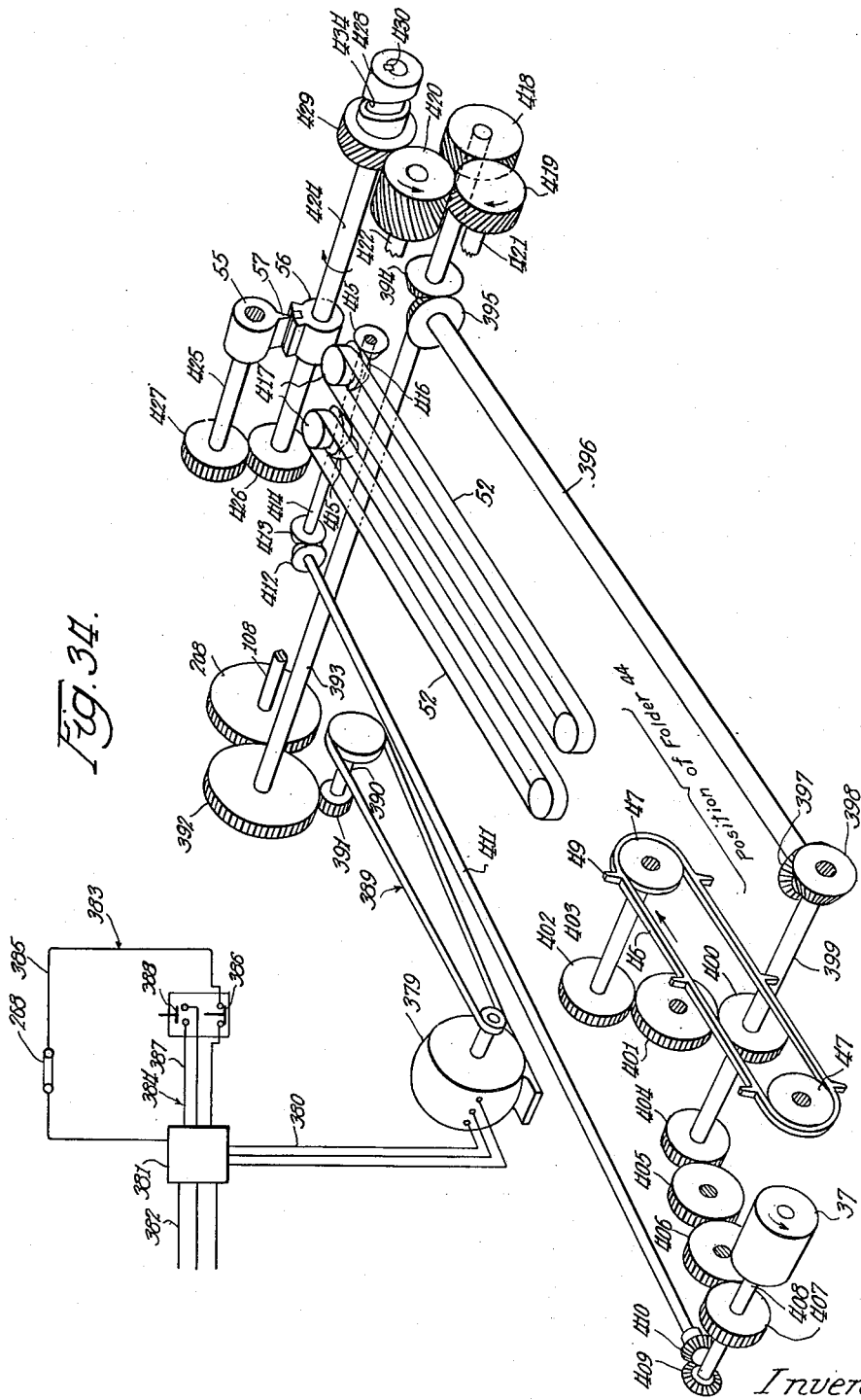

Figs. 26, 27 and 28 are vertical sectional views through the portion of the plow illustrated in Fig. 25 and taken at three different positions indicated by the section lines 26—26, 27—27 and 28—28, a candy bar in each instance being illustrated to show the manner in which the plow performs its operation on the end flaps of the candy bar wrapper;

Fig. 29 is a fragmentary, vertical sectional view taken through the portion of the plow illustrated in Fig. 25, the view being taken along section line 29—29 of Fig. 25, a pusher plate being added to the drawing to illustrate its relative position with respect to a candy bar and the plow;

Fig. 30 is a vertical, longitudinal, sectional view through a final discharge conveyor disposed at the exit end of the final operations conveyor illustrated in Fig. 23, the view illustrating a modified form for the discharge conveyor;

Fig. 31 is a fragmentary top plan view of a pull disc assembly illustrating a modified embodiment of the invention;

Fig. 32 is a side elevational view of the assembly shown in Fig. 31;

Fig. 33 is a vertical sectional view through the pull disc assembly, the view being taken along the line 33—33 of Fig. 32; and Fig. 34 is an exploded diagrammatic perspective view of the drive for certain portions of the machine and illustrating a motor together with a simple circuit diagram for operating the motor.

Two embodiments of the present invention are illustrated herein for the purpose of explaining the present invention. It is recognized, however, that the specific embodiments may be modified without departing from the intended scope of the invention.

For an understanding of the present invention reference is first invited to Figs. 1 and 2 of the drawings where the portion of the machine forming the subject matter of the present machine is diagrammatically illustrated. This machine is generally indicated at 40, and it has a feeding end at the right hand side of the machine as viewed in Fig. 1 and a discharge end at the left hand side of the machine. Candy bars indicated at 41 are fed by means of a conveyor 42 into the machine at the feeding end thereof. Also at the feed end of the machine is fed a continuous strip of wrapping paper shown at 43 that is fed from a supply (not shown) that most conveniently may be in the form of a large roll (also not shown) mounted directly on the machine. This wrapping paper 43 is fed over a paper feed roller 37 (Fig. 2) after having had glue applied along its side edges at appropriate locations for forming a paper tube described hereinafter. Guide rollers 38 and 39 help in the paper feed operation. This paper 43 is fed into a folder generally indicated at 44 that may be of any conventional type suitable for wrapping candy bars. A feeding platform 45 is disposed at the entrance or feeding end of folder 44 and the belt conveyor 42 discharges the candy bars 41 directly onto this feeding platform 45. Mounted directly below the feeding platform 45 and the folder 44 is an endless chain conveyor 46 that operates about a pair of spaced sprocket wheels 47. The feeding platform 45 extends beneath the entrance end of the folder 44 and forms the bottom wall thereof throughout the remainder of the length of the folder.

As best shown in Fig. 1 this feeding platform 45 and bottom wall of the folder 44 is provided with a longitudinally extending slot or perforation 48 that extends throughout the entire distance between the sprocket wheels 47 and is disposed directly above the chain conveyor 46. This chain conveyor 46 is provided with a plurality of pusher lugs 49 that are adapted to project through the aperture 48 to a position above the platform 45. Thus when the candy bars 41 are fed onto the feeding platform 45 by conveyor belt 42 they are placed in the path of the lugs 49 so that as the chain conveyor 46 moves between sprocket wheels 47 in a counterclockwise direction as viewed in Fig. 2 of the drawings, each lug 49 engages the end of a candy bar 41 and pushes it into and through the folder 44 to the end of the travel of the conveyor chain 46.

While the candy bar 41 is thus being fed into the folder 44 the wrapping paper 43 is also being fed into the folder 44. The manner in which this wrapping paper 43 is wrapped around the sides and underneath the candy bars by folder 44 and the actual structure of the folder 44 forms no part of the present invention and in fact is very conventional in wrapping machines for candy bars and the like. The paper 43 is actually fed over the top of each candy bar 41 and as the bar 41 and the paper progresses through the folder 44 the paper is brought down around both sides of the candy bars by means of plows indicated at 51 in Fig. 5 and the paper is finally folded underneath the bars to the position shown in Fig. 4. Thus when the candy bars reach the discharge end of folder 44 they are completely enclosed in a tube-like member indicated at 43a in Fig. 4 that is formed by the wrapping paper 43. This tube 43a of paper 43 with its contents is then conveyed in the direction of the arrow indicated at A in Fig. 2 by means of conveyor belts 52 disposed on both sides of the paper tube 43a toward the left-hand end of the machine as viewed in Fig. 1.

The wrapping paper 43 as it is first being fed into the machine at the right hand end as viewed in Fig. 1 is caused to pass over a set of glue applicators (not shown) of a conventional type that applies a longitudinal strip 53 of glue along one edge of the paper at spaced intervals and a pair of transverse strips 54 of glue, the strips being spaced apart in distance greater than the length of each candy bar. This application of glue again is conventional practice in machines of this type so that the manner of applying the glue and the structural equipment used to accomplish this is neither shown nor described herein. The purpose of the longitudinal strips 53 of glue indicated in broken lines in Fig. 1 is to effect a seal of the wrapping paper underneath the candy bars to form the closed tube 43a shown in Fig. 4. The purpose of the transverse pairs of glue strips 54 is to seal off the ends of the wrapper for each individual bar at the time the tube 43a of the proper is cut into paper lengths. This latter operation is accomplished at the cut-off position shown in Fig. 1 of the drawings.

At the cut-off point indicated in Fig. 1 of the drawings there is provided a cut-off and crimping roller 55 that is disposed horizontally above the line of travel of the candy bars through the machine. Directly below the cut-off roller 55 is an anvil roller 56. As shown in Fig. 2 the tube 43a of paper containing the candy bars 41 passes between the cut-off roller 55 and the anvil roller 56. Once again both the cut-off roller and the anvil roller are very conventional and per se do not constitute the present invention. In making the present disclosure it will suffice to point out that the cut-off roller 55 is mounted to rotate in the direction indicated by the arrow B in Fig. 9 and is provided with a cut-off member or knife 57, on each side of which is disposed a crimper 58. The anvil roller 56 is likewise mounted to rotate about a horizontal axis and is provided with an anvil 59 on each side of which is mounted a crimper 60 that complements the corresponding crimper 58 on the cutter roller 55.

Just adjacent to the cut-off roller 55 on the feed side thereof as best shown in Figs. 1 and 9 is a pair of tucker rollers 61, each of which is mounted to rotate about a vertical axis on an arm, a portion of which is shown at 62 in Fig. 3. These tucker rollers 61 again are conventional in machines of this sort and are disposed on opposite sides of the tube 43a of wrapping paper that contains the spaced apart candy bars 41. By some suitable means these tucker rollers are urged together so as to tuck in the sides of the tube 43a in the manner shown in Fig. 3 in the spaces between the candy bars 41. Since both the structure and function of the tucker rollers 61 mounted on arms 62 are conventional and well known, it would only unnecessarily complicate the present description to show more of the structure that supports and operates them. It should be stated, however, that during the period each of the candy bars 41 is passing between the tucker rollers 61, these tucker rollers are spread apart so as not to engage and damage the sides of the bars. This is accomplished by suitable cam means that operates in timed relationship with the feed of the tube 43a of paper containing the candy bars 41.

The continuous tube 43a is fed, as previously mentioned, between the cutter roller 55 and the anvil roller 56 and from the discharge side of these last mentioned rollers the tube 43a is fed between a pair of spaced pull discs 63. The structure and function of these pull discs will be described hereinafter more completely. It should be understood, however, at this time that the continuous tube 43a of wrapping paper containing the spaced candy bars 41 is advanced between the pull discs 63 approximately to the position shown in Fig. 1 where the specific candy bar 41a is shown with the last portion only of the candy bar still remaining between the pull discs 63. It is not until the paper tube has reached this last mentioned position that the first cut-off is made to sever the first candy bar 41a with its portion of the wrapper from the remainder of the tube 43a. The object of the pull discs 63 is to effect a constant pull on the wrapper that surrounds the first candy bar 41a during the cutting operation and then immediately following this cutting operation the pull discs 63 release the bar 41a that has just been cut off. At this time such bar is disposed on a conveyor belt 64 shown in Fig. 2 that operates about a pair of spaced pulleys 65 and moves in the direction in which the candy is moving as shown by arrow A in Fig. 2. The speed of movement of this conveyor belt 64 is greater than the speed of travel of the tube 43a so that as soon as the first candy bar 41a with its wrapper is severed from the continuous tube 43a it moves away from the advancing edge of the next bar until bar 41a reaches a stop member generally indicated at 66 in Figs. 1 and 2. This stop member which will be described more in detail hereinafter brings the severed bar 41a to an abrupt state of rest and this position is the end point of travel in the direction corresponding from right to left in Figs. 1 and 2. Each of the severed bars is then moved in a transverse direction indicated by the arrow C in Fig. 1 so that from this point on each bar is travelling with its side edge serving as its leading edge. The function of the remainder of the machine is to fold the ends of the wrapper down and under each candy bar and to cement or glue these ends to the underneath face of the wrapper.

Figure 7:
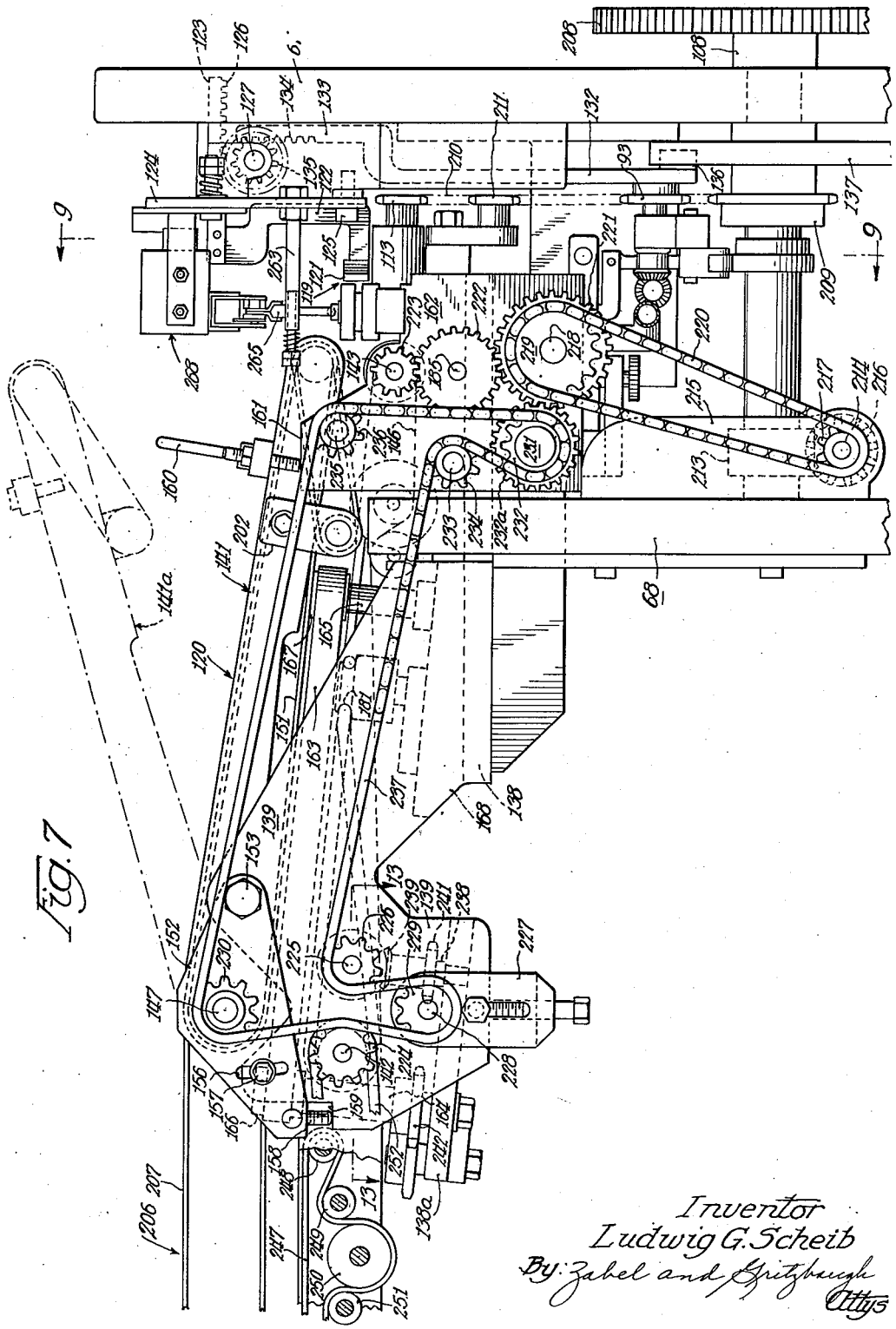
Fig. 7 is an end view of the portion of the machine illustrating in Fig. 6, the view being taken in the direction indicated by arrows 7—7 of Fig. 6.

All the various parts and mechanisms that cooperate to perform the various steps and operations just described are supported on a machine frame that includes a pair of spaced upright walls 67 and 68 (see Figs. 6 and 7). As best shown in Fig. 6 a supporting wall 69 extends inwardly from wall 67 and supported on this inwardly extending wall 69 is a pull disc assembly generally indicated at 70 of which the pull discs 63 form a part. Referring to Figs. 9 and 10 the pull disc assembly 70 includes a pair of C-frame members 71a and 71b mounted respectively on shafts 72a and 72b. A machine screw or the like 73 secures the C-frame 71a or 71b as the case may be to its respective shaft. The shafts 72a and 72b in turn are held in corresponding apertures 74a and 74b respectively, in the wall 69 and project through the wall 69 and beyond the opposite face. Mounted on the projecting end of each of these shafts 72a and 72b is an arm 75 that is fixed to the shaft by means of a machine screw or the like indicated at 76. Each of the shafts 72a and 72b is free to rotate in its respective aperture 74a and 74b carrying with it the arm 75 on one of its ends and the C-frame 71a or 71b on its other end.

As best shown in Figs. 9 and 10 each of the C-frames 71a and 71b has rotatably mounted therein a vertical shaft 77 on the upper end of each of which is mounted one of the pull discs 63. Each of these pull discs 63 is provided on its peripheral surface with a pad portion 78 of sponge rubber or the like. The lowermost end of each shaft 77 is journalled in its corresponding C-frame 71a or 71b.

Mounted between the spaced C-frames 71a and 71b and secured to wall 69 is an intermediate frame 79 in which are journalled two vertically disposed shafts 80 and 81, as best shown in Figs. 10 and 11. Mounted on shaft 80 is a gear 82 and on shaft 81 is a gear 83. Similarly mounted on one of the shafts 77 (see Figs. 10 and 11) is a gear 84 and on the other shaft 77 is a gear 85. The two gears 82 and 84 are in meshing engagement and gears 83 and 85 are likewise disposed in meshing engagement. Similarly gears 82 and 83 that are mounted on shafts 80 and 81 respectively, are disposed in meshing engagement. Mounted on the lower end of shaft 81 as best shown in Figs. 9 and 11 is a bevelled gear 86 and adjacent to the lower end of this bevelled gear is a horizontally disposed shaft 87 that is journalled in the wall 69. On one end of this shaft 87 is a bevelled gear 88 that is in meshing engagement with the bevelled gear 86 and the other end of this shaft 87 is provided with a bevelled gear 89.

Again referring to Figs. 9 and 10 a bracket 90 is mounted on the wall 69 and journalled in this bracket 90 is a shaft 91. On one end of the shaft 91 is mounted a bevelled gear 92 that is disposed in meshing engagement with the previously mentioned gear 89. A sprocket wheel 93 is mounted on the other end of this shaft 91 and as will hereinafter be described power is imparted to rotate the sprocket wheel 93, which in turn rotates shaft 81 (Fig. 10) through shaft 91, bevelled gears 92 and 89, shaft 87 and bevelled gears 88 and 86 (Fig. 9). This rotation of shaft 81 in turn causes rotation of shafts 77 and 80 through gear pinions 83, 85 and 83, 82. The rotation of gear 82 in turn causes rotation of the adjacent shaft 77 through gear 84. Thus both of the shafts 77 are caused to rotate, thus rotating the pull discs 63.

Also mounted on the bracket 90 (see Figs. 9 to 11 inclusive) is a lever arm 94 that is fulcrumed on a shaft 95 which in turn is held in an aperture 96 in bracket 90. The shaft 95 projects beyond the bracket 90 and a cotter pin 97 is passed through an aperture in the projecting end of the shaft. Similarly the other end of shaft 95 projects beyond the arm 94 and a cotter pin 98 is passed through an aperture in this last mentioned projecting end of shaft 95. The lowermost free end of lever arm 94 is provided with a cam follower roller 99 and the other free end of the lever arm 94 is connected through a link 94a in pivoting relationship as at 100 (see Fig. 11) to one end of an actuating arm 101. This actuating arm 101 is fulcrumed on a pin 102 and is held in place by a suitable cotter pin 103. The opposite end of the actuating arm 101 is provided at 104 with an arcuate bearing surface that engages one end of each of the arms 75. As previously mentioned these arms 75 are mounted on shafts 72, each of which shaft in turn carries one of the C-frame supports 71a and 71b. As the lever arm 94 teeters or rocks about its fulcrumed shaft 95, it causes the actuating arm 101 (Fig. 11) to rock about its shaft 102 and hence rocks arms 75 with their respective shafts 72. The rocking of these shafts 72 causes vertical shafts 77 to move laterally away from and toward each other and thus similarly moves the pull discs 63 alternately away from and toward the candy bar 41 that is passing therebetween. A tension spring 105 is secured between upstanding bosses 106 that are mounted on each of the C-frame members 71a and 71b (see Figs. 9 to 11 inclusive). The actuation of lever arm 94 is effected by a cam 107 mounted on a drive shaft 108 that forms the main drive shaft of the machine and is best shown in Figs. 6, 7 and 19. The cam follower 99 (Fig. 9) rides on the surface of cam 107.

Again referring to Figs. 6 and 9 after a candy bar has been severed from the long tube 43a of wrapping paper, it is deposited as previously mentioned on the belt conveyor 64. The pulleys or drums 65 about which this belt 64 operates are mounted on shafts 65a, which in turn are journalled at their opposite ends in plates or frame members 109. These plates 109 in turn are fastened by some suitable means such as bolts 110 and 111 (see Fig. 9) to the frame of the machine. This entire assembly can be raised and lowered by virtue of slots 112 that are provided in the plates 109. The power for driving the belt 64 is imparted to one of the shafts 65a through a sprocket wheel 113 that is mounted on the shaft 65a. As previously mentioned the conveyor belt 64 moves each severed candy bar with its wrapping to a stop generally indicated at 66. This stop member is mounted on a block 114 which in turn is secured to a bracket 115 that is secured to one of the machine frame walls. The stop member comprises upper and lower jaw-like members 116 and 117 respectively, that are firmly held together by means of a screw 118 that passes into the block 114. Jaws 116 and 117 are flared as at 116a and 117a respectively, so that as the candy bar 41 strikes the stop member the forward or leading end flap on the wrapper projects into the flared jaws though the bar itself is stopped in its travel by the lips 116b and 117b of the jaws. The movement of the bar has thus been stopped and the bar is at this time awaiting the action of a pusher to again commence its travel, but this time the direction of travel is normal to the previous direction of travel of the bar.

Figure 8:
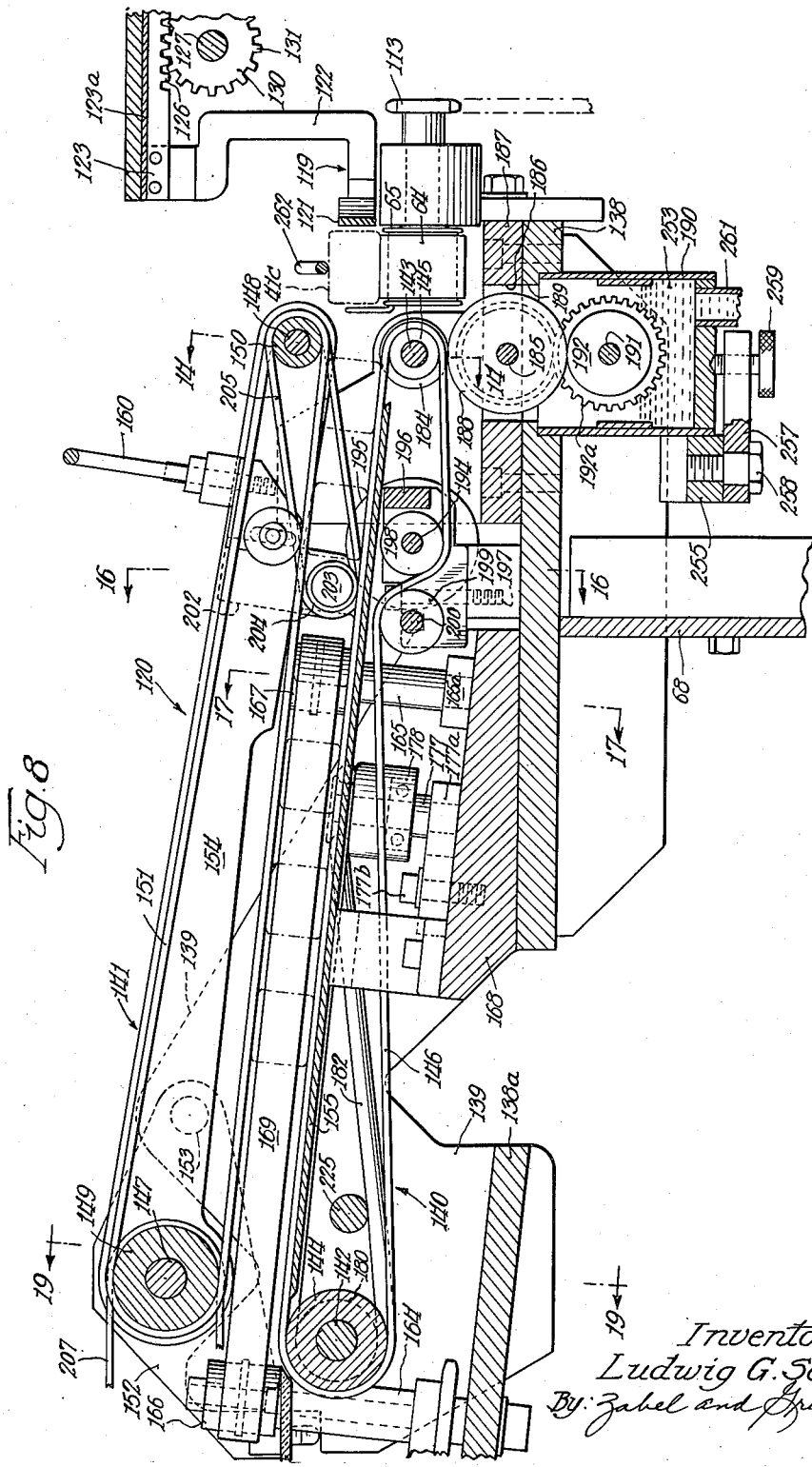
Fig. 8 is a vertical sectional view taken through the wrapping machine, the view being taken along the line 8—8 of Fig. 9.

Referring first to Fig. 1 this next operation that is performed on the bar involves a pusher member generally indicated at 119 that is initially disposed substantially in the position diagrammatically illustrated in Fig. 1 where the bar can pass in front of it but which moves in the direction indicated by the arrow D, to push the bar onto the final operations conveyor generally indicated at 120. The structure and operation of this pusher member 119 is best shown in Figs. 6 to 8 inclusive. The structure includes a pusher plate 121 that is mounted on the lower ends of a pair of pusher arms 122. Each pusher arm 122 is suspended on its upper end on a movable channel shaped rack 123 that is supported in a wall member 124 which in turn is screwed as at 125 onto the portion of upstanding wall 67 of the machine frame. The racks 123 are adapted to slide back and forth in a direction corresponding to their longitudinal dimension and along the edge of each of the rack flanges is disposed a plurality of rack teeth 126. The racks are joined together by a plate 123a.

Disposed at right angles to the length of the racks 123 is a shaft 127 (see Figs. 6 to 8) that is journalled at its opposite ends in bearing members 128 that are secured by means of screws 129 to the wall 67 of the machine frame. Mounted on this shaft 127 is a pair of pinion gears 130 having a plurality of teeth 131 that are adapted to engage the adjacent teeth 126 of the corresponding rack 123.

Referring to Fig. 7 a vertical arm 132 is provided at one of its ends with a rack portion 133 having rack teeth 134. As best shown in Fig. 6 this rack portion 133 is disposed in the region between the spaced pinion gears 130 and the rack teeth 134 on rack 133 are adapted to mesh with a pinion wheel 135 that is mounted on shaft 127 in the region between the previously mentioned pinion gears 130. The lower end of the vertically disposed arm 132 is provided with a lug or cam follower 136 that is adapted to ride in a cam track or groove in a cam wheel 137 that is disposed on the shaft 108. This cam track in cam 137 provides reciprocating movement of the arm 132 in an upward and downward direction in proper timed relationship with the movement of the candy through the machine and this movement of arm 132 in turn imparts similar reciprocating movement to the rack 123 and hence to the pusher plate 121. In this manner the candy bar that is disposed in the position shown at 41c in Fig. 9 is pushed in a transverse direction by pusher plate 121 which corresponds to the direction from right to left in Fig. 8 onto the final operations conveyor 120.

One embodiment of the final operations conveyor 120 is best shown in Figs. 6 to 8 inclusive and is mounted on a base 138 that is supported on the upright wall 68 of the machine frame. Extending upwardly from this base 138 is a pair of spaced side walls 139. Mounted between these spaced side walls 139 are lower and upper conveyor assemblies generally indicated at 140 and 141 respectively. The lower conveyor assembly 140 comprises spaced shafts 142 and 143 on which are mounted drums 144 and 145 respectively (see Fig. 8). A belt 146 operates over the drums 144 and 145. The upper conveyor assembly 141 comprises a pair of spaced shafts 147 and 148 on which is mounted a pair of drums 149 and 150 respectively. About each pair of drums 149, 150 operates a belt 151. The shaft 147 is mounted in spaced plate members 152, each of which in turn is pivotally mounted as at 153 on one of the spaced side walls 139. Pivotally mounted on the shaft 147 is an upper conveyor assembly frame that includes spaced side frame members 154. The shaft 148 is mounted between and supported by these spaced side frame members 154. The lower belt 146 along its upper course rides on a platform 155 that is fixed between the upstanding side walls 139. The spacing of the upper conveyor assembly 141 above this platform 155 can be adjusted. To do this, the plate members 152 that support shaft 147 are adjustable as best shown in Fig. 7 where each plate is provided with an arcuate slot 156 adjacent to the end opposite its pivot or fulcrum mounting 153. A bolt 157 is adapted to pass through each of the arcuate slots 156 and is threaded into the adjacent upstanding side wall 139 and can be drawn tight to hold the plate member 152 in place. Thus by first loosening each of the bolts 157, their respective plate members 152 can be rotated in a clockwise or counterclockwise direction about their respective fulcrums 153 so as to raise or lower the shaft 147 with respect to the lower belt assembly 140. When the relative position of the shaft 147 has been properly selected bolts 157 may be drawn tight to retain this selected position. An adjusting screw 158 is provided in each of the plate members 152 and each screw 158 is adapted to rest on a shoulder 159 provided in the adjacent side wall 139. Upon turning the threaded screw 158 in a clockwise direction the corresponding plate 152 rotates clockwise about its fulcrum 153. Conversely, upon returning the screw 158 in a counterclockwise direction the corresponding plate 152 rotates in a counterclockwise direction. The entire upper conveyor assembly 141 can be raised or lowered as best indicated in Fig. 7 where the lower position is shown in dotted lines and the raised position is shown at 141a in broken lines. An adjusting screw 160 is provided adjacent to the free end of the upper conveyor assembly 141 and this screw is adapted to rest on an abutment 161 that forms the top edge of a plate 162 that extends upwardly above the base 138 on the inner side of wall 68. There are two of these upstanding plates 162 disposed on opposite sides of the base 138. By adjusting the position of the screw 160 it is possible to fix the free end of the upper end of the conveyor assembly 141 with respect to the lower conveyor assembly 140.

As best shown in Fig. 6 there is disposed on each side of the lower conveyor assemblies 140 a side belt conveyor assembly, each of which is generally indicated at 163. Each of these side belt conveyor assemblies 163 comprises a pair of spaced upstanding shafts 164 and 165 upon which are mounted drums 166 and 167, respectively. Each shaft 165 is secured to a block 165a (see Figs. 6 and 17) which in turn is screwed as at 165b onto a block 168. As best shown in Fig. 8 the base 138 over the major portion of its length is disposed horizontally but is provided with an upwardly inclined portion 138a on which the shafts 164 are mounted. The inclined block 168 is mounted on the horizontal portion of the base 138. A side belt 169 operates about each of the pairs of spaced apart drums 166 and 167.

As best shown in Fig. 6 each of the side belt conveyor assemblies 163 is provided with a backer assembly generally indicated at 170, each of which comprises a fixed plate 171 that is securely mounted on a bracket member 172. A movable backing plate 173 is spaced from the fixed plate 171 and rests against the inner face of the inner course of belt 163. A plurality of upper and lower pins 174 are fixed to the inner side of backing plate 173 and project inwardly and through corresponding apertures in the fixed plate 171. Compression springs 175 are mounted concentrically over the pins 174 and are seated between fixed plate 171 and the movable backing plate 173. Thus the movable backing plate 173 may move toward the fixed plate 171, being guided in this movement by pins 175 that are free to move in their respective slots or apertures in the fixed plate 171. The springs 175 urge the movable plate 173 away from fixed plate 171 and against the inner course of belt 169.

Again referring to Figs. 6 to 8 inclusive, there is provided beneath the lower conveyor assembly 140 a pair of bottom flap folding units generally indicated at 176, each of which includes an upstanding shaft 177 on which is mounted a drum 178. Each shaft 177 is mounted on a block 177a which in turn is secured as at 177b (Fig. 8) to the block 168. The drum 144 previously mentioned as being mounted on horizontal shaft 142 includes pulley wheel portions 179 on each side of the drum, each pulley wheel portion 179 being circumferentially grooved as at 180 (see Fig. 6). Similarly, each of the drums 178 is circumferentially grooved at 181 as best shown in Figs. 7 and 8. A flap folding belt 182 of circular cross section operates between one of the drums 178 and one of the pulley portions 179 of drum 144 and a second identical belt 182 operates between the other drum 178 and pulley wheel portion 179. Both belts fit into the grooved portions of the drums and pulleys. As will be noted in Fig. 6 the belts 182 are spaced apart at one end a distance corresponding to the distance between the inner courses of side belts 169. In travelling along the length of these flap folding belts toward their opposite ends, they converge toward each other. As will be noted in Fig. 8 the upper course of each of the flap folding belts 182 is disposed flush with the upper course of the lower belt 146.

As best shown in Figs. 6 and 8 mounted on the shaft 143 in addition to drum 145 is a pair of initial tucker rollers 183, one being mounted on each side of the lower conveyor belt 146. Also mounted on the shaft 143 is a pair of spaced apart glue applicator discs 184, one being mounted on each side of the lower conveyor belt 146.

Referring to Fig. 8 a shaft 185 is journalled in the walls of an aperture 186 of a plate 187 that is mounted on the base 138 and a pair of spaced intermediate glue rollers 188 disposed respectively below the glue applicator discs 184 are mounted on the shaft 185. Disposed below the aperture 186 in plate 187 is a corresponding aperture 189 in the base 138. A glue pot 190 is mounted below this aperture 189 and is aligned therewith. Mounted on a shaft 191 that is journalled in the glue pot 190 is a primary glue applicator roller 192 that engages the periphery of the intermediate glue roller 188.

Disposed between shaft 143 and the side belt conveyor assemblies 163 is a final tucker assembly generally indicated at 193 that includes a shaft 194 upon which are mounted spaced tucker rollers 195. This shaft 194 is mounted in a frame 196 as best shown in Fig. 8, that is secured by means of screws 197 to the appropriate machine framing parts. Mounted on the shaft 194 between the tucker rollers 195 is a drum 198. A pressure roller 199 is mounted on a shaft 200 that is likewise journalled in the frame 196. The lower belt 146 passes over the drum 198 and the pressure roller 199 serves as a take-up roller to take up the slack in the belt. The belt 146 then serves to rotate drum 198 and consequently the tucker rollers 195.

Referring now to Figs. 8, 14 and 16 the horizontally disposed shaft 148, upon which the drums 150 are mounted, also is provided with a pair of drums 201 that are spaced at opposite ends of the shaft. Spaced from this shaft 148 and extending downwardly from each of the side framing members 154 of the upper belt assembly 141 is a bracket 202 at the lower end of which is disposed a shaft 203 that is journalled between the brackets 202. Mounted on this shaft 203 is a pair of drums 204. Operating about each of the drums 204 and the corresponding drum 201 is a flap belt 205 that slopes downwardly from the drum 150 to drum 204.

As shown in Figs. 6 to 8 inclusive a final exit conveyor generally indicated at 206 is disposed at the discharge end of the conveyor unit 120 and this exit conveyor 206 includes a belt 207 that operates at one end of the conveyor about the drum 149 (see Fig. 8).

The drive for the complete wrapping machine is provided through a plurality of shafts having chain and sprocket drives and gear drives. Referring to Figs. 6, 7 and 9, the main drive shaft 108 is provided with a main drive gear 208 that is operatively connected through a series of gears to a suitable prime mover, such as an electric motor 379 (see Fig. 34). Mounted on the shaft 108 is a sprocket wheel 209 which is keyed to the shaft 108 so as to rotate therewith. The sprocket chain indicated in broken lines at 210 in Fig. 9 operates about this sprocket wheel 209 and about sprocket wheels 93 and 113 which were previously described. An idler take-up sprocket 211 is mounted on an idler arm 212 that in turn is secured to upright plate 162. Thus as the motor drives the shaft 108 through gear 208 the sprocket wheel 209 drives sprocket chain 210 and hence rotates sprocket wheels 93 and 113, thereby rotating pull discs 63 and operating belt conveyor 64.

The rotation of shaft 108 also rotates the cam 137 (see Fig. 7) so as to operate the pusher mechanism that includes the pusher plate 121.

Also mounted on the shaft 108 is a spiral gear 213 and directly below this spiral gear 213 is a stub shaft 214 that is journalled in a wall 215 that extends outwardly from the wall 68. Mounted on this stub shaft 214 is a gear 216 that meshes with spiral gear 213. Also mounted on shaft 214 is a sprocket wheel 217 that is pinned to the shaft to rotate therewith. A stub shaft 218 is mounted on the upright plate 162 and mounted on this stub shaft 218 is a sprocket wheel 219. A sprocket chain 220 operates about this sprocket wheel 219 and the previously mentioned sprocket wheel 217. Also mounted on the shaft 218 is a gear 221 which in turn meshes with a gear 222 that is mounted on the shaft 185. This gear 222 in turn meshes with a gear 223 that is mounted on the shaft 143. Thus as the shaft 108 rotates under the influence of the motor drive it operates the sprocket chain 220 so as to rotate the system of gears 221, 222 and 223. The latter gear 223 is keyed to shaft 143 so as to operate the lower belt 146. Gear 222 in turn meshes with gear 192a (Fig. 8) on shaft 191 to rotate glue applicator roller 192.

Again referring to Fig. 7 a sprocket wheel 224 is mounted on the shaft 142. Disposed adjacent to shaft 142 and journalled between walls 139 is a shaft 225 on which is mounted a sprocket wheel 226. Below shafts 142 and 225 and supported on an adjustable bracket 227 is a stub shaft 228. Mounted on this shaft 228 is an idler take-up sprocket 229. Mounted on shaft 147 of the upper conveyor assembly 141 is a sprocket wheel 230 that is keyed to the shaft 147 to rotate therewith. Mounted at the other end of the final operations conveyor assembly 120 is a stub shaft 231 on which is mounted a sprocket wheel 232 and a gear 232a that meshes with gear 219. Adjacent to shaft 231 is an idler stub shaft 233 on which is mounted an idler sprocket wheel 234 and above this shaft 233 is a stub shaft 235 on which is mounted a sprocket wheel 236. Operating about sprocket wheels 224, 229, 226, 234, 232, 236 and 230 is a sprocket chain 237 which is powered by rotation of sprocket wheel 232. By virtue of the rotation of the sprocket wheel 230 the upper conveyor belt 151 is caused to move.

As best shown in Figs. 6, 7 and 13 an upstanding shaft 238 is journalled in the base portion 138a and mounted on the upper end of this shaft 238 is a bevelled gear 239 that meshes with a bevelled gear 240 (see Fig. 13) mounted on shaft 225. Also mounted on this shaft 238 is a sprocket wheel 241. Mounted on the shaft 164 (see Figs. 7 and 13) is a sprocket wheel 242 and disposed on the other side of the machine is an upstanding shaft 243 on which is mounted a sprocket wheel 244. A sprocket chain 245 operates about sprocket wheels 241, 242 and 244 so that as the sprocket wheel 226 (Fig. 7) is rotated in the manner previously described, the shaft 225 is likewise rotated, thereby rotating shaft 238 through the bevelled gears 239 and 240. Rotation of shaft 238 in turn moves sprocket chain 245 to rotate shafts 164 and 243 through the sprocket wheels 242 and 244 respectively.

Again referring to Fig. 13 a sprocket wheel 246 is mounted on the shaft 164a that corresponds to shaft 164 but is located on the other side of the machine. This shaft 164a is one of the pair of shafts previously described that supports one of the drums 166 that forms part of one of the side conveyor belt assemblies 163. The sprocket chain 245 (Fig. 13) operates about sprocket wheel 246 that is mounted on this shaft 164a. Thus as the sprocket chain 245 is driven from the wheel 241, both of the shafts 164 and 164a are rotated, thereby placing both of the side conveyor assemblies 163 into operation. The lower conveyor assembly 140 and the upper conveyor assembly 141 are also operating in the manner previously described. The operation of the upper conveyor belt 151 causes the shaft 148 (see Fig. 8) to rotate, thereby placing into operation the flap belts 205.

Again referring to Fig. 7 the discharge conveyor unit that includes the upper hold-down conveyor belt 207 that was previously described, also includes a lower conveyor belt 247 that operates about drums indicated at 248, 249, 250, 251 and others not shown. This discharge conveyor forms no part of the present invention but receives its power from a suitable sprocket chain 252 that operates off of another sprocket wheel (not shown) mounted on shaft 142.

As previously mentioned with reference to Fig. 8, the glue pot 190 is mounted underneath the opening 189 in the base 138. This glue pot per se forms no part of the present invention and is shown in the form of a box or container that is adapted to receive a supply of glue indicated at 253. This glue pot 190 is supported on a frame best shown in Figs. 8 and 9 that includes side members 254 and a bottom member 255 that is screwed as at 256 to the side members 254. This bottom member 255 is disposed beyond the glue pot 190 as shown in Figs. 8 and 9 and a bracket 257 is secured to the member 255 by screws 258 and projects beneath the glue pot 190 but is spaced below the bottom of the glue pot. A thumb nut 259 is threaded through an aperture in the bracket 257 and is adapted to engage the bottom wall of the glue pot 190 so as to hold the glue pot in place. By loosening the thumb nut 259 the glue pot 190 can be removed.

Referring to Fig. 9 a filling reservoir 260 is mounted on the side of the machine and a pipe 261 connects this filling reservoir 260 to the glue pot so that the supply of glue 253 in the glue pot 190 can be replenished by merely pouring a fresh supply in the reservoir 260.

Mounted above the conveyor belt 64 (see Fig. 9) is a safety switch actuating arm 262 that is pivotally mounted at 263 to the machine. This arm can be moved up and down about its pivot point 263. Though it is held in this downward direction by its own weight the relative height of this arm 262 above the conveyor belt 64 can be adjusted by a thumb nut 264 that engages the top of the stop member 66. Engaging the arm 262 near the fulcrum or pivot point 263 is a roller 265 that is mounted on the free end of a switch actuating arm 266. This switch actuating arm 266 is pivotally mounted to move up and down, thereby moving a switch engaging member 267 toward and away from an electric switch 268. Thus safety switch actuating arm 262 if raised relative to the conveyor belt 64, moves the switch engaging member 267 into engagement with the switch 268 so as to shut off the motor operating the entire wrapping machine mechanism in the manner that will be described hereinafter. Thus if for any reason there is a piling up of candy bars beneath the switch actuating arm 262, this accumulation of candy beneath the switch actuating arm 262 raises the arm to shut off the motor actuating the wrapping machine mechanism, thereby bringing to rest candy that is disposed on the machine.

*Operation*

Referring now to Figs. 1 and 2, candy bars 41 as previously mentioned are introduced into the machine by conveyor 42 and the wrapping paper 43 is wrapped around the sides and underneath the candy bars as the bars progress through the folder 44 until the wrapping paper 43 forms the continuous tube 43a that is shown in Fig. 4. When first placing the machine into operation, it is necessary to gradually feed the leading candy bar between the cutter and anvil rollers 55 and 56, respectively, during the time when the cutter knife 57 and the anvil 59 are disposed away from each other somewhat in the position shown in Fig. 9. The leading candy bar along with the tube 43a is pulled by hand further through the machine until the pull discs 63 engage the sides of the leading bar as shown in Fig. 1. After the proper relative positions have been adjusted by hand the machine is started slowly and the first one or two bars are discarded if necessary, until the proper feed relationship is established. The machine is now placed into full operation.

As the tube 43a with its candy bar is conveyed between the tucker rollers 61, the sides of the wrapper between adjacent bars are tucked in as shown in Fig. 3 and then as this area moves between the cutter roller 55 and anvil roller 56 the leading crimping members 58, 60 engage the upper and lower faces respectively, of the wrapper and seal and crimp these faces together just ahead of the place where the cut-off is effected. The knife and anvil combination 57, 59, then are brought into engagement with the wrapper and sever the wrapper disposed around the first bar from the remainder of the tube 43a. The second set of crimper members 58, 60 following the knife and anvil combination 57, 59, seal and crimp the leading flap on the following candy bar wrapper so that as this following bar is brought into position so that the next cut-off can be effected between the second and third bars, the leading end of the flap on the second bar has already been sealed and crimped.

During the time each of the cutting operations is being effected the bar to be severed from the remainder of the tube 43a is held between pull discs 63. These pull discs 63 are being rotated while the cutting operation is taking place at a rotating speed greater than the speed of travel of the conveyor belts 52 (see Fig. 1). The direction of rotation of pull discs 63 is indicated by the arrow in Fig. 3 so that a wiping or pulling action is being maintained against the sides of the bar that is severed from the remainder of the tube 43a, thereby constantly maintaining a wrapper on the leading bar in a taut condition while the cutting operation is going on. The conveyor belt 64 upon which the leading edge of the cut off bar is disposed during the cut-off operation (see Fig. 2), is likewise travelling at a greater speed than that of the conveyor belts 52. As soon as the leading bar 41a has been severed from the elongated tube 43a, it is in a sense thrown forward by virtue of the more rapid speed of the conveyor 64, until it is abruptly brought to rest against the stop member 66. Immediately at the conclusion of the cut-off operation the pull discs 63 are separated by operation of the mechanism disclosed in Fig. 11 that includes the lever arms 75 and the new leading edge of the tube 43a is fed forwardly between the separated pull discs until the next cut-off position is reached. During this same period when the leading end of the continuous tube 43a is being fed between the pull discs 63 the cutting and anvil rollers 55 and 56, respectively, are rotating to again bring the crimper and cutting members 58, 60 and 57, 59 into proper position to again engage the continuous tube 43a in proper position in the next cut-off. Just before the leading crimpers are again brought into engagement to effect the next crimping operation, the pull discs 63 are again brought in engagement with the sides of the new leading candy bar 41a and the crimping and cut-off operations are repeated.

During the time that the following candy bar is being fed between the pull discs 63 the previously cut-off leading candy bar that momentarily has assumed the position indicated at 41c in Fig. 9 is immediately engaged by the pusher plate 121 shown diagrammatically in Fig. 1, that is now moving in the direction indicated by the arrow D. This movement of the pusher plate 121 is accomplished in timed relationship with the other parts of the machine in response to the operation of the cam follower 136 best illustrated in Fig. 7, that operates in a cammed track in the cam 137. At the proper moment promptly after a cut-off candy bar has been brought to an abrupt stop against the stop member 66 (see Fig. 9) at which time the candy bar assumes the position shown at 41c, the cam follower 136 is caused to move in an upward direction as viewed in Fig. 7, by the cam 137, thereby moving the vertical arm 132 and the rack portion 133 thereof in an upward direction. This rotates the sprocket 135 with its shaft 127 in a counterclockwise direction as viewed in Fig. 7 and hence moves the rack 123 through the gear 130 in a direction from right to left as viewed in Figs. 7 and 8. Thus the pusher plate 121 is brought against the candy bar that now assumes the position 41c shown in Fig. 9 and pushes it onto the final operations conveyor 120 that includes the lower conveyor belt 146 shown in Fig. 8. The upper conveyor belt 151 serves as a hold-down belt that engages the top of the candy bars that are moved along by the lower conveyor belt.

The candy bars are now moving in a direction transverse with respect to the length of the candy bars and when each bar is first deposited upon the final operations conveyor 120, the end flaps that are shown at 269 extend substantially horizontally as best shown in Fig. 14. The first operation in the final folding procedure is for each candy bar 41 to pass over the initial tucker rollers 183 that may be referred to as pre-tuckers and as shown in Fig. 14, these pre-tuckers 183 engage the underneath face of the end flaps 269 and partially tuck these faces inwardly. At the same time the candy bar 41 is passing over the glue applicator rollers or spotters 184 that deposit a strip of glue on the underneath face of the wrapper adjacent to each end of the bar. As the candy bar 41 is further advanced along the final operations conveyor 120 by means of the lower and upper conveyor belts 146 and 151, respectively, the end flap belts 205 best shown in Figs. 7 and 16, engage the end flaps and as the candy bar advances along the length of these flap belts 205, the end flaps are bent downwardly in a progressive manner. Just before the candy bar reaches the final end of each of the flap belts 205, it passes over the final tucking wheels 195 so as to complete the tucking operation as illustrated in Fig. 16. The candy bar then leaves the flap belts 205 in a condition illustrated in Fig. 18 and next is engaged by the side belts 169 shown in Figs. 7 and 17.

As the side belts 169 engage the end flaps 269 that are now substantially bent downwardly as shown in Fig. 18 they complete the downward folding of these end flaps so that they are disposed in a true vertical direction as shown in Fig. 17. The candy bar 41 now is brought into engagement with the folding belts 182 that form part of the bottom folding units 176. Since these belts converge toward each other in a progressive manner from the folding units as the bar passes over they effect a folding in of the flaps as best shown by Figs. 17 and 19 during the time the candy bar 41 is moved along the conveyor from the position where the round belts 182 are first engaged until the bar reaches the discharge end of the final operations conveyor 120. Since glue has previously been deposited by glue spotters 185 on the underneath face of the wrapper the folding in of the flaps by the round belts 182 brings the ends of these flaps into engagement with these strips of glue. The hold-down or top belts 151 urge the candy bar 41 downwardly against the round belts 182 (Fig. 19), thereby effectively sealing the flaps against the bottom of the wrapper. The finally wrapped bar is next deposited on the discharge conveyor where belts 274 and 207 carry the candy bars away from the wrapping machine.

Referring now to Figs. 21 to 29 inclusive, a second embodiment of a final operations conveyor generally indicated at 270 is illustrated. In this form of the invention a machine frame member or platform 271 is mounted on wall 68 of the machine. Mounted on this platform 271 is a plate 272 on which are mounted upstanding brackets 273. At the back of the platform 271 is disposed a block member 274 that is mounted on the platform 271. An upstanding bracket 275 is screwed as at 276 to the block 274 and mounted on top of this bracket 275 and the bracket 273 is a flat plate 277. Screwed to this plate 277 is a skid plate 278 that is made of some material that has a low cohesion property with respect to glue, chocolate, candy and the like. A suitable material has been found to be a synthetic plastic known as "Teflon" that is put out by the Du Pont De Nemours E. I. & Co. This material is polytetrafloroethylene.

Also mounted on the platform 271 is a pair of spaced brackets 279, each of which supports a side plate member 280 (see Figs. 23 and 24). To each of these side plate members 280 is secured a Teflon plow member 281, these members being disposed on the opposite sides of the Teflon skid plate 278. Each of these Teflon side plow members is also secured to one of the brackets 273.

Referring now to Figs. 23 and 24 the machine frame includes a pair of spaced upright frame members 282 in which is journalled a shaft 283 (see Figs. 21, 22 and 23). Mounted on this shaft is an upper conveyor assembly generally indicated at 284 that includes spaced side frame members 285 held in rigid spaced apart relationship by a spacer 286 (Fig. 22). Disposed at the free end of this assembly 284 and fixed in the spaced side frame members 285 is a shaft 287 on which is rotatably mounted a pair of sprocket wheels 288 that are spaced apart on the shaft 287. At the other end of the assembly 284 and fixed to the rotatable shaft 283 is a pair of spaced apart sprocket wheels 289. A pair of sprocket chains 290 is disposed in parallel relationship, one sprocket chain 290 operating over one pair of sprocket wheels 288, 289, and the other sprocket chain operating over the other pair of sprocket wheels 288, 289. Disposed transversely between the sprocket chains 290 and fixed at their opposite ends to these spaced sprocket chains are a plurality of candy bar pusher plates 291 that are spaced at equal intervals throughout the endless sprocket chains 290.

As shown in Figs. 22 and 23 there are two idler arms 292, each of which is pivotally mounted as at 293 on one of the spaced side frame members 285 of the assembly 284 and fixed to the free end of each of these idler arms 292 is a stub shaft 294. Rotatably mounted on each of these stub shafts 294 is an idler sprocket wheel 295 that is adapted to take up the slack in the upper course of the corresponding sprocket chain 290. Similarly, a second idler arm 296 is pivotally secured as at 297 to each of the side frame members 295 of assembly 284 and to the free end of each of these idler arms 296 is fixed a stub shaft 297a. On each of these stub shafts 297a is mounted an idler sprocket wheel 298 that is adapted to engage the corresponding sprocket chain 290 to take up the slack in the lower course thereof.

Referring now to Figs. 23 and 24, projecting downwardly from the spacer frame member 286 is a pair of spaced posts 299, each of which projects through an aperture 300 in the spacer 286 and is threaded on its upper end to receive a nut 301. These posts 299 are spaced apart so that each one is located above and adjacent to one or the other of the plow members 281. Fixed to the lower end of each of these posts 299 is an upper plow member 302, to the inner face of which is attached a Teflon plow member 303.

As best shown in Fig. 23 each of the lower Teflon plow members 281 is provided with an upwardly inclined plow face 281a, the direction of incline being from the right to left as viewed in Fig. 23. Each of the upper Teflon plow members 303 is provided with a downwardly sloping plow edge 303a, the direction of slope being downwardly from right to left as viewed in Fig. 23. There is thereby provided complementary converging plow edges 281a and 303a on each side of the Teflon skid plate 278, so that as candy bars are introduced in a direction from right to left as viewed in Fig. 23 onto the Teflon skid plate 278, the end flaps shown at 269 of a candy bar 41 first enters between the widely spaced apart member and lower plow edges 303a and 281a respectively and as the candy bar moves from right to left on the Teflon skid plate 278 the upper plow edge 303a sloping downwardly as it does projects and finally engages the corresponding end flap 269 of the candy bar, while the lower Teflon plow edge 281a sloping upwardly as it does, gradually approaches and finally engages the underneath face of the corresponding flap 269 until the candy bar reaches the position indicated at 41d in Figs. 24 and 25 where the paper closely adjacent to the ends of the candy bar 41 has been neatly pressed downwardly and tucked upwardly to conform to the shape of the end wall of the candy bar.

Referring to Fig. 25 it will be noted that the Teflon plow edges 281a and 303a are disposed substantially at right angles to the upright face of the plow members 281 and 303 respectively, in the region from the extreme right hand ends of these members to approximately the position of the candy bar 41b shown in Fig. 25. From this position to the other or left hand end of the plow member 281 as viewed in Fig. 25, the plow edge 281a slopes downwardly from its inner to its outer edge, the amount of slope progressively increasing as the left hand end of the lower plow member 281 is approached. Similarly, the upper plow edge 303a of each of the upper plow members 303 commences to slope downwardly from the inner to the outer edge of the upper plow member 303 at a position approximately corresponding to that assumed by the candy bar 41d shown in Fig. 25 and from this position to the extreme left hand end of the lower plow member 281, this slope of the upper plow edge 303a progressively increases. As best illustrated in Figs. 26 to 28 inclusive the slopes of the lower and upper plow edges 281a and 303a respectively at any one position are corresponding to each other so that these plow edges 281a and 303a are substantially parallel to each other throughout the length of the lower plow member 281.

The upper plow edge 303a in the region behind the lower plow member 281, this region being indicated at 303aa, rapidly merges into a vertical face of the upper plow member 303 at the position indicated by the dotted line showing 41e of the candy bar. Thus as the candy bar moves from the position shown at 41d in Fig. 25, the end flaps 269 are bent downwardly in a progressive manner best illustrated in Figs. 26, 27 and 28 until at the position indicated in Fig. 28 each of the end flaps 269 is disposed vertically against the vertical face of the upper plow member 303.

Referring now to Figs. 22 and 25 an end folding plow 304 is provided on the upper plow member 303 in the region commencing adjacent to the position of the candy bar indicated at 41e in Fig. 25 and extending to the final or left hand end as viewed in Fig. 25 of the plow member 303. This end folding plow 304 is provided with an upwardly inclined plow face 305 that merges at its uppermost end into a horizontal plow face 306. The upwardly inclining plow face 305 at its forwardmost end indicated at 305a in Fig. 25 is vertical to correspond to the vertical face indicated at 303b of the plow member 303 just preceding the forwardmost portion 305a. Between the position indicated at 305a in Fig. 25 and the uppermost end 305b of the inclined plow surface 305, the slope of this surface gradually changes from its vertical position at 305a to the horizontal position indicated at 305b. In Fig. 29 the slope of this plow surface 305 is indicated, this view illustrating an intermediate condition between the positions indicated by the reference numerals 305a and 305b in Fig. 25.

Thus as the candy bar indicated at 41e in Fig. 25 moves from right to left with respect to the plow member 303, the end flap 269 first engages the vertical portion 305a of the inclined plow surface 305 and then is gradually bent underneath the candy bar as illustrated by the position of the flap 269 in Fig. 29 until this flap finally assumes a horizontal position against the bottom face of the candy bar at the time the bar reaches the horizontal plow surface 306 beyond the uppermost end of the inclined plow surface 305. This completes the folding operation of the end flaps.

As shown in Fig. 23 the platform 271 is provided with an opening 307 therein, below which is mounted a glue pot 308. Similarly the block 274 is apertured at 309 in the region over the aperture 307 and mounted above this aperture 309 on a shaft 310 are glue spotters generally indicated at 311 that include a pair of spotter arms 312. The shaft 310 is journalled in the spaced upright frame members 282. Mounted on a shaft 313 that is journalled in the walls of the glue pot 308 is an intermediate glue applicator roller 314 alongside of which is mounted a glue applicator roller 315 that is similarly mounted on a shaft 316. A supply of glue 317 is contained in the glue pot 308.

In this embodiment of the invention the rotating power from the sprocket chain 220 that was originally described in connection with the first embodiment of the invention illustrated in Fig. 7 is again imparted to the sprocket wheel 219 illustrated in the second embodiment (Fig. 21). Mounted on the shaft 218 is a gear 221 that meshes with a gear 318 (see Fig. 22) that is mounted on a shaft 319 (Fig. 21), that in turn is mounted on a plate 320 forming part of the machine frame. Mounted on the shaft 319 is a sprocket wheel 321. Disposed above this sprocket wheel 321 is an idler sprocket wheel 322 that is likewise rotated on the plate 320. Mounted below the shaft 283 at the opposite end of the machine is a shaft 323 that is supported between upstanding frame members 282 and mounted on this shaft 323 is a sprocket wheel 324. As shown in Figs. 22 and 23 a sprocket wheel 325 is mounted on the shaft 283. Disposed adjacent to the sprocket wheel 324 is a stub shaft 326 that is mounted on one of the upstanding frame members 282 and rotatably mounted on this stub shaft is a sprocket wheel 327. A sprocket chain 328 operates about sprocket wheels 321, 322, 325, 323 and 324, respectively. Engaging the lower course of this sprocket chain 328 is a sprocket wheel 329 that is mounted on the shaft 310 that supports the glue spotters 311 (see Fig. 23). Also mounted on shaft 310 is a sprocket wheel 330 (Fig. 21) and mounted on shaft 316 is a sprocket wheel 331. A sprocket chain 332 operates about sprocket wheels 330 and 331.

Thus the power transmitted by the sprocket chain 220 is conveyed to shaft 310 through gears 221 and 318. The rotation of shaft 319 in turn operates the sprocket chain 328 through the sprocket wheel 321 that is keyed or otherwise fixed to the shaft 319. This operating movement of the sprocket chain 328 rotates shaft 283, which in turn imparts rotation to the sprocket wheels 289 (Fig. 22), thus placing into operation the sprocket chains 290 that carry with them the candy bar pusher members 291. The direction of movement of these sprocket chains 290 is indicated by the arrow in Fig. 21. The pusher members 291 are disposed along the lower course of the sprocket chains 290 are moving in the direction from right to left as viewed in Fig. 21, to engage the candy bar 41c shown in Fig. 21 and moving it in a direction from right to left along the Teflon bottom skid plate 278. This position 41c of the candy bar illustrated in Fig. 21 corresponds to the position 41c of the candy bar illustrated in Fig. 9 where the end flaps of the candy bar wrapper are in exactly the same condition shown in Fig. 9 where the first embodiment is illustrated.

The spacing between the pusher plates 291 along the sprocket chains 290 is such that during the normal operation of the machine a new pusher plate 291 is brought into engagement with a new candy bar 41c just the moment this candy bar reaches the position indicated in Fig. 9 where it is ready to be moved onto the final operations conveyor. As the candy bar is moved up the slightly inclined Teflon bottom skid plate 278 shown in Fig. 22 the end flaps of the candy bar wrapper, which at this time assume the position illustrated in Fig. 9, pass between the widely spaced ends of the bars of plow edges 281a, 303a that are disposed on the opposite sides of the Teflon bottom skid plate 278. The end flaps are then folded downwardly in the manner previously described as the candy bar is moved up the skid plate 278.

At the time the candy bar assumes the position indicated in broken lines 41e in Fig. 25 which corresponds to the showing in Fig. 28, the bar passes over the glue spotters 311. At this time one of the glue applicator arms 312 of each of the glue spotters 311 is disposed in a substantially vertical direction so as to engage the underneath face of the wrapper that is disposed around the candy bar, and a strip of glue is thus deposited on the bottom of the wrapper adjacent to each end of the candy bar. The operation of the glue spotters will be described later. This position of one of the glue applicator arms 312 is illustrated in Fig. 28. Thus as the candy bar moves up the inclined plow surfaces 305 in the manner previously described (see Fig. 25) and the end flaps 269 are folded underneath the candy bar and finally brought into engagement with the bottom face of the wrapper that is disposed around the candy bar, the flaps are brought into engagement with the strips of glue that were previously deposited by the glue spotters 311.

As can be seen in Fig. 23 each of the pusher plates 291 is provided with a hold-down plate portion 291a which, when the candy bar is being moved up the bottom skid plate 278, is disposed over the candy bar and prevents the latter from raising up off the skid plate.

When the bars finally reach the top of the skid plate 278 they are pushed off the skid plates by the pusher plates 291 and deposited on the spaced apart flat plow surfaces 306 as illustrated by the position of the candy bar 41f in Fig. 23. A hold-down strip 335 (see Figs. 23 and 25) is fastened as at 336 to each of the plow members 303 at the discharge end thereof. This is to prevent the candy bars 41f shown in Fig. 23 from being raised and carried upwardly by the pusher plates 291 as the latter are passing upwardly around the peripheries of the sprocket wheels 289 shown in Fig. 23. These candy bars are then pushed by the next succeeding candy bars onto the discharge conveyor assembly 337 (shown in Fig. 23).

Referring now to Fig. 21, the operation of the sprocket chain 328 rotates sprocket wheel 329 and hence shaft 310 to which the sprocket wheel is fixed. Thus by referring to Fig. 23, it will be noted that the rotation of shaft 310 imparts rotation to the glue applicators 311, both of which are keyed or otherwise fixed to the shaft 310.

Again referring to Fig. 21, the rotation of shaft 310 imparts rotation to shaft 316 through the sprocket wheel and chain system including the sprocket wheel 330, the sprocket chain 332 and sprocket wheel 331. The rotation of shaft 316 (see Fig. 23) imparts rotation to the glue applicator roller 315, the latter of which being in engagement with the intermediate glue applicator roller 314, imparts rotary motion to the latter. Due to the relationship of the drives, the glue applicator roller 314 moves in the direction indicated by the arrow in Fig. 23 so that the surfaces of the glue spotter arms 312 when in engagement with the periphery of the applicator roller 314, are travelling in the same direction as the periphery of the adjacent roller 314.

A take-up sprocket wheel 333 engages the lower course of the sprocket chain 328 to take up the slack and adjustment of the take-up sprocket wheel 333 can be effected by means of a suitable adjusting mechanism generally indicated at 334 in Fig. 21.

In connection with this second embodiment of the invention the discharge conveyor 337 that serves the function of the previously mentioned discharge conveyor 206 illustrated in Figs. 6 and 7, comprises upper and lower conveyor belts 338 and 339 respectively that operate respectively about spaced shafts 340, 341 and 342, 343. As best shown in Fig. 30 a hold-down guide block 344 is disposed adjacent to the shaft 341 and this is supported on a frame structure generally indicated at 345 that is suspended by means of a shaft 346 from a bracket 347. An adjusting screw 348 permits vertical adjustment of the frame 345 so as to permit proper spacing of the hold-down guide block 344 with respect to the lower belt 339.

Mounted between the shafts 340 and 341 is a longitudinally extending channel-shaped frame 349 in which are pivotally mounted a plurality of weights 350, each of which is pivoted at one end as indicated at 351 to the channel shaped frame 349. These weights 350 on their opposite ends rest on the lower course 338a of the upper belt 338, thereby exerting a downward pressure on the lower course of the upper belt.

The drive for the lower belt 339 is best illustrated in Fig. 21 and includes a suitable gear 352 that meshes with a second gear 353, the latter of which is disposed on the driven shaft 341 of the upper belt assembly. The gear 352 meshes with a gear 354 which in turn meshes with a gear 355 that is mounted on shaft 326. The drive for the shaft 326 has previously been described. Again referring to Fig. 30 the lower belt 339 also passes between rollers 356 and 357.

Thus as the candy bars 41 leave the final operations conveyor 270 shown in Fig. 23, they are deposited on the moving lower conveyor 339, the upper course of which is travelling in a direction corresponding from right to left in Fig. 30 and as soon as each bar reaches the position directly under the hold-down guide block 334, the lower course 338a of the upper belt 338 exerts a downward pressure on the bar, which downward pressure is continually applied by virtue of the effect of weights 350 throughout the length of travel of the bars along the discharge conveyor 337. This downward pressure on the bar effectively seals the end flaps that have previously been folded against the underneath face of the wrappers.

Referring now to Figs. 31 to 33, a modified form of pull discs is illustrated with their drive mechanism. These pull discs with their drive correspond in function with those illustrated in Figs. 9 and 10, but are simpler in construction and operation. In this form of the invention the pull discs are illustrated at 358. Each pull disc 358 comprises a disc member 359 about a segment of the periphery of which is mounted a bar contacting member 360 that is made of some suitable resilient material, such as sponge rubber. Each pull disc 358 is mounted on a vertically disposed shaft 361 that is journalled on its lower end at one end of an arm 362. Each of these arms 362 in turn is pivotally mounted at its other end on a stub shaft 363 that is suspended from the frame member or platform 271 as best shown in Fig. 32. A suitable nut 364 is threaded onto the upper end of the stub shaft 363. Each arm 362 is apertured intermediate its ends to receive a stub shaft 366 that is supported at its upper end in a horizontally disposed plate member 367, which in turn is bolted as at 368 onto the machine frame. The plate 367 is provided with arcuate slots 365 in which the stub shafts 366 are disposed. The upper end of each stub shaft 366 is threaded to receive a nut 369.

Mounted on the lower end of each stub shaft 366 is an idler or intermediate gear 370 and disposed between the plate 367 and the arm 362 is an adjusting nut 371 that is threaded onto the stub shaft 366. Thus as best shown in Fig. 31, the spacing between the discs 358 can be adjusted by first loosening nuts 371 and then pivoting the arms 362 toward or away from each other within the limits of the adjusting slot 365. After the position has once been selected the adjusting nuts 371 can be tightened.

Again referring to Fig. 32 mounted on the bottom of the vertical shaft 361 is a gear 372 that meshes with the idler or intermediate gear 370. Similarly on the stub shaft 363 is a gear 373 that meshes with the idler or intermediate gear 370.

As best shown in Fig. 31, the structures for each of the pull discs 358 is identical so that there are two sets of gear trains 370, 372 and 373. The two stub shafts 363 are disposed side by side so that the two gears 373 are in meshing relationship with each other. Mounted on the bottom of one of the stub shafts 363 is a bevelled gear 374 that meshes with a second bevelled gear 375, the latter of which is mounted on a shaft 376 that is journalled in a bracket 377 and the machine frame. This bracket 377 is secured by means of screws 378 to the machine frame member or platform 271. As best shown in Fig. 33, the shaft 376 has mounted on its end the sprocket wheel 93 that forms part of the drive mechanism previously described. Thus the drive for the pull discs 358 is self-evident from the description previously set forth in connection with the drive for the pull discs 63 illustrated in Fig. 9.

In the embodiment of the invention shown in Figs. 31 to 33, the pull discs 358 are located in the same relative positions as the pull discs 63 illustrated in Fig. 6. In other words, they are disposed closely adjacent to the discharge side of the cutter roller 55 so that as each candy bar passes under and projects beyond the cutter roller, it is disposed between the pull discs 358. During the time that the candy bar is being advanced between the pull discs 358, shown in Fig. 31, the pull discs are being rotated, but the portions of the periphery that are not provided with the bar contacting members 360, are disposed adjacent to the advancing candy bar. After the candy bar has reached the proper position for cut-off; that is, at the time the leading crimper 58 of the cutting roller engages the wrapper and commences the initial crimping operation, the candy bar contacting members 360 on the pull discs 358 come into contact with the sides of the wrapped candy bar and create a wiping action against the sides of the wrapped bar so as to constantly urge the bar forward to maintain the wrapper taut while the crimping and cut-off operations are being performed on the wrapper. As soon as the cut-off has been completed and the cutter roller 55 rotated so as to release the leading candy bar, the pull discs 358 while the candy contacting members 360 are still in engagement with the sides of the candy bar, rapidly move the bar in its forward direction of travel further onto the conveyor belt 64. The candy bar contacting members 360 have now moved out of the way to permit the next candy bar to be fed unobstructedly between the pull discs 358. The operation is then repeated.

As previously mentioned the rotating speeds of the pull discs 358 and the belt 64 are greater than those for the cutting rollers 55 and the feed conveyors 52. Also it has been found preferable that the linear speed of the belt 64 exceed the linear speed of the periphery of the pull discs 358 so that a cut-off bar of candy can be advanced to the end of its travel along the conveyor 64 and move out of the way onto the final operations conveyor before the next following candy bar is released by the cutter. Thus the proper operating cycle for the pull discs is obtained.

So far the drives for the various parts of the machine have related back to the main shaft 108, shown for example in Fig. 6. In order to illustrate a completely operative machine a more or less diagrammatic showing is made in Fig. 34 to indicate how the other parts of the machine not previously described receive their power. Also it will be evident from what was previously said with respect to the various drives just how the power for these drives is derived from a source such as for example as an electric motor 379. This motor 379 is electrically connected through suitable wire 380 to a relay generally indicated at 381. The relay in turn is connected to a power line which in the present instance is through conductors 382. In the present instance a three phase A. C. power line is illustrated. The circuit from the relay 381 to the motor 379 includes an operating shut-off circuit indicated at 383 and a starting circuit 384. The shut-off circuit 383 includes a conductor 385, the electric or microswitch 268 that was previously described in connection with the showing in Fig. 9 of the safety switch actuating arm 262, and a manual stop switch 386. The starting circuit 384 includes a conductor 387 and a normally open manual switch 388. The relay 381 per se forms no part of the present invention and consequently its detailed structure is not disclosed herein. The purpose of the relay is to permit the safety switch actuating arm 262 shown in Fig. 6 to effectively shut down the machine in the event there is a pile up of the candy underneath the arm. The microswitch 268 is normally closed but when it is opened in the manner previously described by the switch actuating arm 262 the relay 381 becomes deenergized so as to open the circuit to the motor 379 and maintain this circuit open until the switch 388 is closed to reset the relay 381. There are many types of relays available to perform this function.

The manual switch 386 is provided for normal starting and stopping of the machine. The motor 379 (see Fig. 34) is connected by a belt drive indicated at 389 to a shaft 390. This shaft is geared through gears 391 and 392 to the previously mentioned gear 208 that is mounted on shaft 108. It is from the shaft 108 that all of the previously described drive mechanisms receive their power. The gear 392 is mounted on the end of a shaft 393 that passes transversely through the machine frame and is supported therein. Mounted on the shaft 393 is a bevelled gear 394 that meshes with a second bevelled gear 395 mounted on the end of a longitudinally disposed drive shaft 396. This shaft 396 is suitably journalled in the machine frame and on the opposite end of this shaft is mounted a bevelled gear 397 that meshes with a bevelled gear 398. This latter bevelled gear 398 is mounted on a shaft 399, which in turn carries a gear 400. Gear 400 forms one of a train of gears that includes an intermediate gear 401 and a driven gear 402, the latter of which is mounted on a shaft 403 that carries one of the sprocket wheels 47 shown in Fig. 2. The chain conveyor 46 shown in Fig. 2 thus receives its power from the motor 379 through the mechanism just described.

Also mounted on the shaft 399 is a gear 404 that is one gear in a train including gears 405, 406 and 407. Gear 407 in turn is mounted on a shaft 408 on which is also mounted the paper feed roller 37. Thus the paper feed roller 37 is likewise driven from the motor 379. Also mounted on the shaft 408 is a bevelled gear 409 that meshes with a second bevelled gear 410, the latter of which is mounted on one end of a longitudinally disposed shaft 411. On the other end of shaft 411 is a bevelled gear 412 that meshes with a bevelled gear 413, the latter of which is mounted on a shaft 414. The shaft 414 carries a pair of bevelled gears 415, each of which meshes with an adjacent bevelled gear 416 that is fixed to a shaft that supports a belt pulley or drum 417. These pulleys or drums 417 form part of the conveyors shown in Fig. 1 that include the conveyor belts 52. Thus conveyor belts 52 also are powered by the motor 379 through the mechanism just described.

Still referring to Fig. 34 there is mounted on the end of shaft 393 a gear 418 that meshes with an intermediate gear 419, the latter of which meshes with a gear 420. Gears 419 and 420 are mounted on stub shafts 421 and 422 respectively. As shown in Fig. 6 the stub shaft 422 is supported by means of a bracket 423 on one wall 68 of the machine.

Referring now to Figs. 6 and 34 the anvil roller 56 that was previously mentioned is mounted on a shaft 424 and the cutter roller 55 is mounted on a shaft 425. These two shafts are geared together through gears 426 and 427 that are mounted on shafts 424 and 425 respectively. On the other end of the shaft 424 is mounted a cam member 428 that includes a gear 429 disposed in meshing engagement with gear 420. The shaft 424 is slotted longitudinally thereof as indicated at 430 in Fig. 6 and the cam and gear 428, 429 are keyed in this slot and are adapted to slide longitudinally along the shaft 424 within the limits of this slot 430. Secured to the machine wall 68 by means of a screw 431 (see Fig. 6) is a bracket 432, on the free end of which is disposed a lug 433 that serves as a stationary cam follower. The cam 428 is provided with a cam track indicated at 434 in Figs. 6 and 34 and as shown in Fig. 6 the lug or cam follower 433 is disposed in this cam track 434. Both the cam 428 and the gear 429 are fixed to rotate with the shaft 424, though both are permitted longitudinal sliding motion along this shaft as previously described. The cam track 434 is disposed entirely around the periphery of the cam 428 and though only one side of the track is shown in Fig. 6 the other side is a substantial duplicate. As the cam and gear assembly 428, 429 rotate they carry with them the shaft 424, but due to the action of the cam follower 433 in the cam track 434, the cam 428 and the gear 429 are caused to slide back and forth in oscillating fashion on the shaft 424.

Thus the power for the cutter roller 55 and anvil roller 56 is derived from the electric motor 379 through shaft 393 and the gears 418, 419, 420 and 429. As shown in Figs. 6 and 34, the gears 418, 419, 420 and 429 are helical gears so that as gear 429 travels in one longitudinal direction along shaft 424 during rotation of the train of gears 418, 419, 420 and 429, the rate of rotation of shaft 424 is slower than the rotation of shaft 422 but when the gear 429 moves linearly in the opposite direction along its shaft 424, there is a sharp increase in the rotating speed of the shaft 424 in spite of the fact that at all times gear 420 rotates at a constant speed.

It is, of course, important that the linear velocity of the cutter knife 57 and anvil 59 correspond with the linear velocity of the tube of wrapping paper 43a during the time the crimpers 58, 60 and the cutter knife 57 and anvil 59 are in engagement with the wrapper. During the remainder of the revolutions of the cutter and anvil rollers 55 and 56 respectively, the rotating speed is unimportant. Thus if the normal rotating speed of the cutter and anvil rollers 55 and 56 respectively is such that the normal linear velocity of the cutter knife 57 and crimpers 58 is greater than the velocity of the tube of paper as is the case in the present embodiment, it is necessary to reduce the rotating speeds of the cutter and anvil rollers 55 and 56 respectively, during the time that the crimping and cutting operations are being performed. This is accomplished by sliding the gear 429 in the proper direction along its shaft 424 and at the proper predetermined rate of movement. The pitch of the cam track 434 over that portion of its length that corresponds to the positions of the cutter and anvil rollers 55 and 56 respectively, while the latter are performing the crimping and cutting operations, is calibrated so as to provide the proper linear velocity for the cutter knife, the anvil and the crimpers. After the final crimping operation has been completed and the cutter and crimpers are moved out of engagement with the anvil portion of the anvil roller 56, the rotating velocities for the cutting and anvil rollers 55 and 56 are no longer critical so that the pitch of the cam track 434 throughout the remainder of the circumference of the cam 428 is not critical. It is only essential that the cam track 434 be so designed that it return the gear 429 to its starting point at the proper moment to again retard the rotating velocities of the cutter and anvil rollers 55 and 56 to effect the proper linear speeds for the cutter, anvil and crimpers when these members are again brought into engagement with each other.

Obviously if the system were designed so that the cutter and anvil rollers 55 and 56 respectively, normally travelled at a slower speed than required to effect a proper cutting and crimping operation, then the function of the gear 429 would be to slide along this shaft 424 in the proper direction and at the appropriate rate of movement so as to increase the linear speed of travel of the cutter knife, the anvil and the crimpers during the cutting and crimping operations so that these members are travelling at the same rate of speed as that of the wrapping paper upon which they are performing these operations.

I claim

1. A machine for cutting off and partially folding segments of a tube of wrapping paper disposed about spaced apart candy bars comprising a feed conveyor for said tube, a pair of spaced tucker rollers for folding inwardly the sides of said tube between said bars, means for engaging said tucker rollers with said tube only when the tube region between bars passes between said rollers, means beyond said tucker rollers for folding into superposed relation the top and bottom portions of the tube region between bars, said folding means including in succession a first crimping means, a cutting means and a second crimping means, a discharge conveyor leading away from said folding, crimping and cutting means, and a pair of spaced pull discs adjacent the discharge side of said folding, crimping and cutting means, said pull discs having means cooperating therewith to effect engagement between said discs and said tube just prior to operation of said first crimping means and disengagement therebetween just after operation of said cutting means, the pull discs and said discharge conveyor being driven to move the bars at a greater speed than said feed conveyor.

2. The combination of claim 1 wherein said pull discs are carried on generally vertical shafts and wherein means are provided to move said shafts toward and away from said tube to effect engagement and disengagement of said discs and said tube.

3. The combination of claim 1 wherein said pull discs are carried on fixed-position vertical shafts, said pull discs each having a bar engaging member of resilient material disposed only partly around the periphery of the disc and projecting outwardly beyond the margin of the disc whereby said bar engaging member engages the bar only during a portion of the revolution of the disc.

4. In a candy wrapping machine, a plow system for folding the ends of a moving tubular wrapper containing a candy bar, the sides of the wrapper ends having previously been tucked in and the top and bottom portions of the ends having previously been crimped together in superposed relation, said top and bottom portions extending horizontally away from the bar ends, said plow system comprising a pair of spaced plow assemblies, one for each bar end, each assembly including spaced upper and lower plow members having opposed cam surfaces, said cam surfaces being progressively inclined whereby the horizontally extending top and bottom end portions of the wrapper are folded downwardly through 90°, said upper plow member having an extension in the direction of bar travel that presents an inclined surface to the portion of the wrapper end extending below the bar, the incline of said surface varying in the direction of bar travel from vertical to horizontal whereby said wrapper end portion extending below the bar is folded beneath the bar into superposed relation with a portion of the wrapper on the bar bottom, and a skid plate for supporting the bar between said plow assemblies.

5. The combination of claim 4 wherein said skid plate is cut away in the region between the junctures of the respective upper plow members and the said extensions thereof, and wherein spaced glue applicators are provided which extend through the cut away areas of said skid plate to apply glue to portions of the wrapper on the bottom of said bar, which portions are remote from wrapper portions engaged by said plow members whereby transfer of glue to said plow members is avoided.

6. The combination of claim 4 with an endless conveyor for moving said wrappers and contained bars through said plow system, said endless conveyor having a plurality of spaced pusher plates for engaging the trailing side of the respective wrappers and bars, each pusher plate having a hold-down portion overlying the upper surface of a wrapper and contained bar whereby same are prevented from raising up in a manner to produce improper plow action.

LUDWIG G. SCHEIB.

REFERENCES CITED

The following references are of record in the file of this patent:

UNITED STATES PATENTS

| Number | Name | Date |
|---|---|---|
| 1,341,408 | Armstrong | May 25, 1920 |
| 1,434,248 | Knewitz | Oct. 31, 1922 |
| 2,050,126 | Rose | Aug. 4, 1936 |
| 2,117,347 | Molins | May 17, 1938 |
| 2,296,142 | Campbell | Sept. 15, 1942 |
| 2,335,970 | Schmidt | Dec. 7, 1943 |
| 2,420,525 | Deloye | May 13, 1947 |
| 2,462,254 | Campbell | Feb. 22, 1949 |
| 2,488,446 | Swiss | Nov. 15, 1949 |